US012094419B2

(12) United States Patent
Xiang

(10) Patent No.: US 12,094,419 B2
(45) Date of Patent: Sep. 17, 2024

(54) DISPLAY PANEL AND DISPLAY DEVICE

(71) Applicant: Wuhan China Star Optoelectronics Semiconductor Display Technology Co., Ltd., Hubei (CN)

(72) Inventor: Songpo Xiang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/600,108

(22) PCT Filed: Sep. 6, 2021

(86) PCT No.: PCT/CN2021/116673
§ 371 (c)(1),
(2) Date: Sep. 30, 2021

(87) PCT Pub. No.: WO2023/019651
PCT Pub. Date: Feb. 23, 2023

(65) Prior Publication Data

US 2024/0105124 A1 Mar. 28, 2024

(30) Foreign Application Priority Data

Aug. 19, 2021 (CN) ........................ 202110956347.3

(51) Int. Cl.
*H01L 27/32* (2006.01)
*G09G 3/20* (2006.01)
(Continued)

(52) U.S. Cl.
CPC ......... *G09G 3/3266* (2013.01); *G09G 3/2074* (2013.01); *G09G 3/32* (2013.01);
(Continued)

(58) Field of Classification Search
CPC ...... G09G 3/3266; G09G 3/2074; G09G 3/32; G09G 3/3233; G09G 2300/0426;
(Continued)

(56) References Cited

U.S. PATENT DOCUMENTS

2005/0285830 A1 12/2005 Iwabuchi
2021/0043702 A1* 2/2021 Zhao ...................... H10K 59/65

FOREIGN PATENT DOCUMENTS

CN 106959781 7/2017
CN 107591124 1/2018
(Continued)

OTHER PUBLICATIONS

International Search Report and the Written Opinion Dated Mar. 28, 2022 From the International Searching Authority Re. Application No. PCT/CN2021/116673 and Its Translation Into English. (16 Pages).

*Primary Examiner* — Abdul-Samad A Adediran

(57) ABSTRACT

The present application discloses a display panel and a display device. The display panel includes pixel rows, auxiliary pixel driver circuits, main pixel driver circuits, and gate electrode driver circuits. Scan signal lines of each level include auxiliary scan signal lines of a number Q. Connecting first auxiliary scan signal lines of a number Z of the auxiliary scan signal lines of a number Q to corresponding ones of the gate electrode driver circuits and setting an end of second auxiliary scan signal lines to float prevents setting a connection wire connecting two of the auxiliary scan signal lines to avoid coupling.

20 Claims, 10 Drawing Sheets

(51) Int. Cl.
*G09G 3/32* (2016.01)
*G09G 3/3233* (2016.01)
*G09G 3/3266* (2016.01)

(52) U.S. Cl.
CPC ... *G09G 3/3233* (2013.01); *G09G 2300/0426* (2013.01); *G09G 2300/0842* (2013.01); *G09G 2300/0861* (2013.01); *G09G 2310/0267* (2013.01)

(58) Field of Classification Search
CPC ... G09G 2300/0842; G09G 2300/0861; G09G 2310/0267; H10K 59/65
See application file for complete search history.

(56) References Cited

FOREIGN PATENT DOCUMENTS

| | | |
|---|---|---|
| CN | 110232892 | 9/2019 |
| CN | 110491917 | 11/2019 |
| CN | 110874990 | 3/2020 |
| CN | 111261104 | 6/2020 |

* cited by examiner

DISPLAY PANEL AND DISPLAY DEVICE

RELATED APPLICATIONS

This application is a National Phase of PCT Patent Application No. PCT/CN2021/116673 having International filing date of Sep. 6, 2021, which claims the benefit of priority of Chinese Patent Application No. 202110956347.3 filed on Aug. 19, 2021. The contents of the above applications are all incorporated by reference as if fully set forth herein in their entirety.

FIELD AND BACKGROUND OF THE INVENTION

The present application relates to a field of display technologies, especially to a display panel and a display device.

When a camera under panel (CUP) is employed, to lower influence of a pixel driver circuit for driving pixels of a CUP region to emit light to the CUP region, one pixel driver circuit is used to simultaneously a plurality of sub-pixels in the CUP region. In a common boundary between a main display region and the CUP region, at least two scan signal lines are merged into a wire by connection wires to be connected to a pixel driver circuit of the CUP region. A coupling effect is easily occurring between such connection wire and the pixel driver circuit to influence normal display.

SUMMARY OF THE INVENTION

Technical Issue

The embodiment of the present application provides a display panel and a display device to solve a technical issue that in a common boundary between a main display region and a CUP region of a conventional display panel, at least two scan signal lines are merged into a wire by connection wires to be connected to a pixel driver circuit of the CUP region, and a coupling effect is easily occurring between such connection wire and the pixel driver circuit to influence normal display.

Technical Solution

To solve the above issue, the present application provides technical solutions as follows:

The present application provides a display panel, comprising a function add-on region and a main display region surrounding the function add-on region, wherein the function add-on region comprises a light transmission display region and a transition display region located on an outer periphery of the light transmission display region, and the display panel comprises:

- a plurality of pixel rows, wherein the pixel rows comprise a plurality of complex pixel rows, each of the complex pixel rows comprises a plurality of auxiliary sub-pixels located in the function add-on region and a plurality of main sub-pixels located in the main display region;
- a plurality of auxiliary pixel driver circuits, wherein each of the auxiliary pixel driver circuits is connected to the auxiliary sub-pixels and is configured to drive corresponding ones of the auxiliary sub-pixels to emit light, and the auxiliary pixel driver circuits are located in the transition display region;
- a plurality of main pixel driver circuits, wherein each of the main pixel driver circuits is connected to a corresponding one of the main sub-pixels to drive the corresponding one of the main sub-pixels to emit light, and the main pixel driver circuits are located in the main display region; and
- gate electrode driver circuits in levels connected to the auxiliary pixel driver circuits and the main pixel driver circuits respectively through a plurality of scan signal lines, wherein the scan signal lines of each level comprises main scan signal lines of a number P and auxiliary scan signal lines of a number Q, the auxiliary scan signal lines of the number Q comprise first auxiliary scan signal lines of a number Z and second auxiliary scan signal lines of a number (Q-Z), each of the main pixel driver circuits is connected to a corresponding one of the gate electrode driver circuits through a corresponding one of the main scan signal lines, each of the auxiliary pixel driver circuits is connected to a corresponding one of the main scan signal lines through the first auxiliary scan signal line to be connected to a corresponding one of the gate electrode driver circuits, an end of each of the second auxiliary scan signal lines is connected to a corresponding one of the main scan signal lines, and another end floats; wherein $P \geq Q$, $P \geq 2$, $Q \geq 1$, $Q \geq Z$, $Z=1$, and P and Q are integers.

According to the display panel provided by the present application, $P=2$, $Q=2$ or 1.

According to the display panel provided by the present application, an end of each of the second auxiliary scan signal lines is connected to a corresponding one of the main scan signal lines in the main display region, and another end of each of the second auxiliary scan signal lines floats in the transition display region.

According to the display panel provided by the present application, the first auxiliary scan signal line comprises a transition scan section located in the transition display region, and the transition scan section comprises:

- a first transition portion connected to a corresponding one of the main scan signal lines;
- a second transition portion connected to a corresponding one of the auxiliary pixel driver circuits; and
- a third transition portion connected to the first transition portion and the second transition portion;
- wherein the second transition portion is tilted relative to the first transition portion and the third transition portion.

According to the display panel provided by the present application, a (M+1)th one of the pixel rows is a first one of the complex pixel rows, in the first auxiliary scan signal lines connected to the auxiliary pixel driver circuits connected to the auxiliary sub-pixels located in an ith one of the complex pixel rows, the first auxiliary scan signal lines corresponding to the scan signal lines of a Nith level are connected to the main pixel driver circuits connected to the main sub-pixels located in the ith one of the complex pixel rows; wherein $Ni=M+i$, $i \geq 1$.

According to the display panel provided by the present application, the auxiliary pixel driver circuits connected to the auxiliary sub-pixels located in pth to qth ones of the complex pixel rows are connected to the scan signal lines of a Npth level, the scan signal lines of a (Np+Y)th level, and the scan signal lines of a Nqth level, the main pixel driver circuits corresponding to the main sub-pixels located in the ith one of the complex pixel rows are connected to the scan signal lines of the Nith level and the scan signal lines of a (Ni+1)th level; wherein $Np=M+p$, $Nq=M+q$, $Ni=M+i$; $0<Y<Nq-Np$; $p \leq i \leq q$.

According to the display panel provided by the present application, each of the main pixel driver circuits is connected to the gate electrode driver circuits of a number X1, and each of the auxiliary pixel driver circuits is connected to the gate electrode driver circuits of a number X2; wherein $X1 \geq 2$, $X2 \geq 2$, $X2 \geq X1$.

According to the display panel provided by the present application, a Mth one of the pixel rows is a first one of the complex pixel rows, and each of the auxiliary pixel driver circuits connected to the auxiliary sub-pixels located in pth to qth ones of the complex pixel rows comprises:

a first driver module comprising an auxiliary driver transistor;

a first initialization module connected between a first reset voltage end and a gate electrode of the auxiliary driver transistor and configured to transmit a first reset signal to the gate electrode of the auxiliary driver transistor according to a Npth level scan signal and initialize a gate electrode voltage of the auxiliary driver transistor;

a first data writing module connected to a first data signal line and one of a source electrode and a drain electrode of the auxiliary driver transistor and configured to transmit a first data signal to one of the source electrode or the drain electrode of the auxiliary driver transistor according to a (Np+Y)th level scan signal;

a first reset module connected between the first reset voltage end and anodes of corresponding ones of the auxiliary sub-pixels and configured to transmit the first reset signal to the anodes of the auxiliary sub-pixels according to a Nqth level scan signal and reset anode voltages of the auxiliary sub-pixels;

a first compensation module connected between the gate electrode of the auxiliary driver transistor and one of the source electrode or the drain electrode of the auxiliary driver transistor and configured to transmit the first data signal to the gate electrode of the auxiliary driver transistor according to the (Np+Y)th level scan signal and compensate a threshold voltage of the auxiliary driver transistor;

a first storage module connected in series between the gate electrode of the auxiliary driver transistor and a first voltage end and configured to maintain the gate electrode voltage of the auxiliary driver transistor; and a first light emission control module connected in series to the auxiliary driver transistor and configured to control the auxiliary sub-pixels to emit light according to a first light emission control signal;

wherein $Np=M+p$, $Nq=M+q$; $0<Y<Nq-Np$, $p \geq 1$, $q>p$.

The present application provides a display panel, a function add-on region and a main display region surrounding the function add-on region, and the display panel comprising:

a plurality of pixel rows, wherein the pixel rows comprise a plurality of complex pixel rows, each of the complex pixel rows comprises a plurality of auxiliary sub-pixels located in the function add-on region and a plurality of main sub-pixels located in the main display region;

a plurality of auxiliary pixel driver circuits, wherein each of the auxiliary pixel driver circuits is connected to the auxiliary sub-pixels and is configured to drive corresponding ones of the auxiliary sub-pixels to emit light;

a plurality of main pixel driver circuits, wherein each of the main pixel driver circuits is connected to a corresponding one of the main sub-pixels to drive the corresponding one of the main sub-pixels to emit light; and gate electrode driver circuits in levels connected to the auxiliary pixel driver circuits and the main pixel driver circuits respectively through a plurality of scan signal lines, wherein the scan signal lines of each level comprises main scan signal lines of a number P and auxiliary scan signal lines of a number Q, the auxiliary scan signal lines of the number Q comprise first auxiliary scan signal lines of a number Z and second auxiliary scan signal lines of a number (Q−Z), each of the main pixel driver circuits is connected to a corresponding one of the gate electrode driver circuits through a corresponding one of the main scan signal lines, each of the auxiliary pixel driver circuits is connected to a corresponding one of the main scan signal lines through the first auxiliary scan signal line to be connected to a corresponding one of the gate electrode driver circuits, an end of each of the second auxiliary scan signal lines is connected to a corresponding one of the main scan signal lines, and another end floats; wherein $P \geq Q$, $P \geq 2$, $Q \geq 1$, $Q \geq Z$, $Z=1$, and P and Q are integers.

According to the display panel provided by the present application, Z=1.

According to the display panel provided by the present application, P=2, Q=2 or 1.

According to the display panel provided by the present application, the function add-on region comprises a light transmission display region and a transition display region located on an outer periphery of the light transmission display region, the main pixel driver circuits are located in the main display region, and the auxiliary pixel driver circuits are located in the transition display region.

According to the display panel provided by the present application, an end of each of the second auxiliary scan signal lines is connected to a corresponding one of the main scan signal lines in the main display region, and another end of each of the second auxiliary scan signal lines floats in the transition display region.

According to the display panel provided by the present application, the first auxiliary scan signal line comprises a transition scan section located in the transition display region, and the transition scan section comprises:

a first transition portion connected to a corresponding one of the main scan signal lines;

a second transition portion connected to a corresponding one of the auxiliary pixel driver circuits; and a third transition portion connected to the first transition portion and the second transition portion;

wherein the second transition portion is tilted relative to the first transition portion and the third transition portion.

According to the display panel provided by the present application, a (M+1)th one of the pixel rows is a first one of the complex pixel rows, in the first auxiliary scan signal lines connected to the auxiliary pixel driver circuits connected to the auxiliary sub-pixels located in an ith one of the complex pixel rows, the first auxiliary scan signal lines corresponding to the scan signal lines of a Nith level are connected to the main pixel driver circuits connected to the main sub-pixels located in the ith one of the complex pixel rows; wherein $Ni=M+i$, $i \geq 1$.

According to the display panel provided by the present application, the auxiliary pixel driver circuits connected to the auxiliary sub-pixels located in pth to qth ones of the complex pixel rows are connected to the scan signal lines of a Npth level, the scan signal lines of a (Np+Y)th level, and the scan signal lines of a Nqth level, the main pixel driver circuits corresponding to the main sub-pixels located in the ith one of the complex pixel rows are connected to the scan signal lines of the Nith level and the scan signal lines of a (Ni+1)th level; wherein Np=M+p, Nq=M+q, Ni=M+i; 0<Y<Nq−Np; p≤i≤q.

According to the display panel provided by the present application, each of the main pixel driver circuits is connected to the gate electrode driver circuits of a number X1, and each of the auxiliary pixel driver circuits is connected to the gate electrode driver circuits of a number X2; wherein X1≥2, X2≥2, X2≥X1.

According to the display panel provided by the present application, a Mth one of the pixel rows is a first one of the complex pixel rows, and each of the auxiliary pixel driver circuits connected to the auxiliary sub-pixels located in pth to qth ones of the complex pixel rows comprises:

a first driver module comprising an auxiliary driver transistor;

a first initialization module connected between a first reset voltage end and a gate electrode of the auxiliary driver transistor and configured to transmit a first reset signal to the gate electrode of the auxiliary driver transistor according to a Npth level scan signal and initialize a gate electrode voltage of the auxiliary driver transistor;

a first data writing module connected to a first data signal line and one of a source electrode and a drain electrode of the auxiliary driver transistor and configured to transmit a first data signal to one of the source electrode or the drain electrode of the auxiliary driver transistor according to a (Np+Y)th level scan signal;

a first reset module connected between the first reset voltage end and anodes of corresponding ones of the auxiliary sub-pixels and configured to transmit the first reset signal to the anodes of the auxiliary sub-pixels according to a Nqth level scan signal and reset anode voltages of the auxiliary sub-pixels;

a first compensation module connected between the gate electrode of the auxiliary driver transistor and one of the source electrode or the drain electrode of the auxiliary driver transistor and configured to transmit the first data signal to the gate electrode of the auxiliary driver transistor according to the (Np+Y)th level scan signal and compensate a threshold voltage of the auxiliary driver transistor;

a first storage module connected in series between the gate electrode of the auxiliary driver transistor and a first voltage end and configured to maintain the gate electrode voltage of the auxiliary driver transistor; and a first light emission control module connected in series to the auxiliary driver transistor and configured to control the auxiliary sub-pixels to emit light according to a first light emission control signal;

wherein Np=M+p, Nq=M+q; 0<Y<Nq−Np, p≥1, q>p.

According to the display panel provided by the present application, the Mth one of the pixel rows is a first one of the complex pixel rows, and each of the main pixel driver circuits connected to the main sub-pixels located in pth to qth ones of the complex pixel rows comprise:

a second driver module comprising a main driver transistor;

a second initialization module connected between a second reset voltage end and a gate electrode of the main driver transistor and configured to transmit a second reset signal to the gate electrode of the main driver transistor according to a Nith level scan signal and initialize a gate electrode voltage of the main driver transistor;

a second data writing module connected between a second data signal line and one of a source electrode and a drain electrode of the main driver transistor and configured to transmit the second data signal to one of the source electrode or the drain electrode of the main driver transistor according to a (Ni+1)th level scan signal;

a second reset module connected between the second reset voltage end and anodes of the main sub-pixels and configured to transmit the second reset signal to the anodes of the main sub-pixels according to the Nith level scan signal and reset a anode voltage of the main sub-pixels;

a second compensation module connected between the gate electrode of the main driver transistor and the source electrode or the drain electrode of the main driver transistor and configured to transmit the second data signal to the gate electrode of the main driver transistor and compensate a threshold voltage of the main driver transistor according to the (Ni+1)th level scan signal;

a second storage module connected in series between the gate electrode of the main driver transistor and a second voltage end and configured to maintain the gate electrode voltage of the main driver transistor; and a second light emission control module connected in series to the main driver transistor and configured to control the main sub-pixels to emit light according to a second light emission control signal;

wherein Ni=M+p, Nq=M+q; 0<Y<Nq−Np, p≥1, q>p.

The present application provides a display device, comprising a display panel, wherein the display panel comprises a function add-on region and a main display region surrounding the function add-on region, and the display panel comprises:

a plurality of pixel rows, wherein the pixel rows comprise a plurality of complex pixel rows, each of the complex pixel rows comprises a plurality of auxiliary sub-pixels located in the function add-on region and a plurality of main sub-pixels located in the main display region;

a plurality of auxiliary pixel driver circuits, wherein each of the auxiliary pixel driver circuits is connected to the auxiliary sub-pixels and is configured to drive corresponding ones of the auxiliary sub-pixels to emit light;

a plurality of main pixel driver circuits, wherein each of the main pixel driver circuits is connected to a corresponding one of the main sub-pixels to drive the corresponding one of the main sub-pixels to emit light; and gate electrode driver circuits in levels connected to the auxiliary pixel driver circuits and the main pixel driver circuits respectively through a plurality of scan signal lines, wherein the scan signal lines of each level comprises main scan signal lines of a number P and auxiliary scan signal lines of a number Q, the auxiliary scan signal lines of the number Q comprise first auxiliary scan signal lines of a number Z and second auxiliary scan signal lines of a number (Q−Z), each of the main pixel driver circuits is connected to a corresponding one of the gate electrode driver circuits through a corresponding one of the main scan signal lines, each of the auxiliary pixel driver circuits is connected to a corresponding one of the main scan signal lines through the first auxiliary scan signal line to be connected to a corresponding one of the gate electrode driver circuits, an end of each of the second auxiliary scan signal lines is connected to a corresponding one of the main scan signal lines, and another end floats; wherein P≥Q, P≥2, Q≥1, Q≥Z, Z=1, and P and Q are integers.

Advantages

Advantages of the present application are as follows: In the display panel and the display device provided by the present application, each of the auxiliary pixel driver circuits is connected to a plurality of auxiliary sub-pixels to drive corresponding ones of the auxiliary sub-pixels to emit light. Each of the main pixel driver circuits is connected to a corresponding one of the main sub-pixels to drive the corresponding main sub-pixel to emit light. The gate electrode driver circuits in levels are connected to the auxiliary pixel driver circuits and the main pixel driver circuits respectively through a plurality of scan signal lines. The scan signal lines of each level comprise main scan signal lines of a number P and auxiliary scan signal lines of a number Q. The auxiliary scan signal lines of the number Q comprise first auxiliary scan signal lines of a number Z and second auxiliary scan signal lines of a number (Q–Z). Each of the main pixel driver circuits is connected to a corresponding gate electrode driver circuit of through a corresponding one of the main scan signal lines. The present application connects each of the auxiliary pixel driver circuits to the gate electrode driver circuit through first auxiliary scan signal lines of a number Z in the auxiliary scan signal lines of a number Q and makes remaining second auxiliary scan signal lines float without disposing a connection wire merging two scan signal lines into one wire to prevent a coupling effect easily occurring between the connection wire and the pixel driver circuit to prevent influence to normal display.

BRIEF DESCRIPTION OF THE SEVERAL VIEW OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

Figure 1:
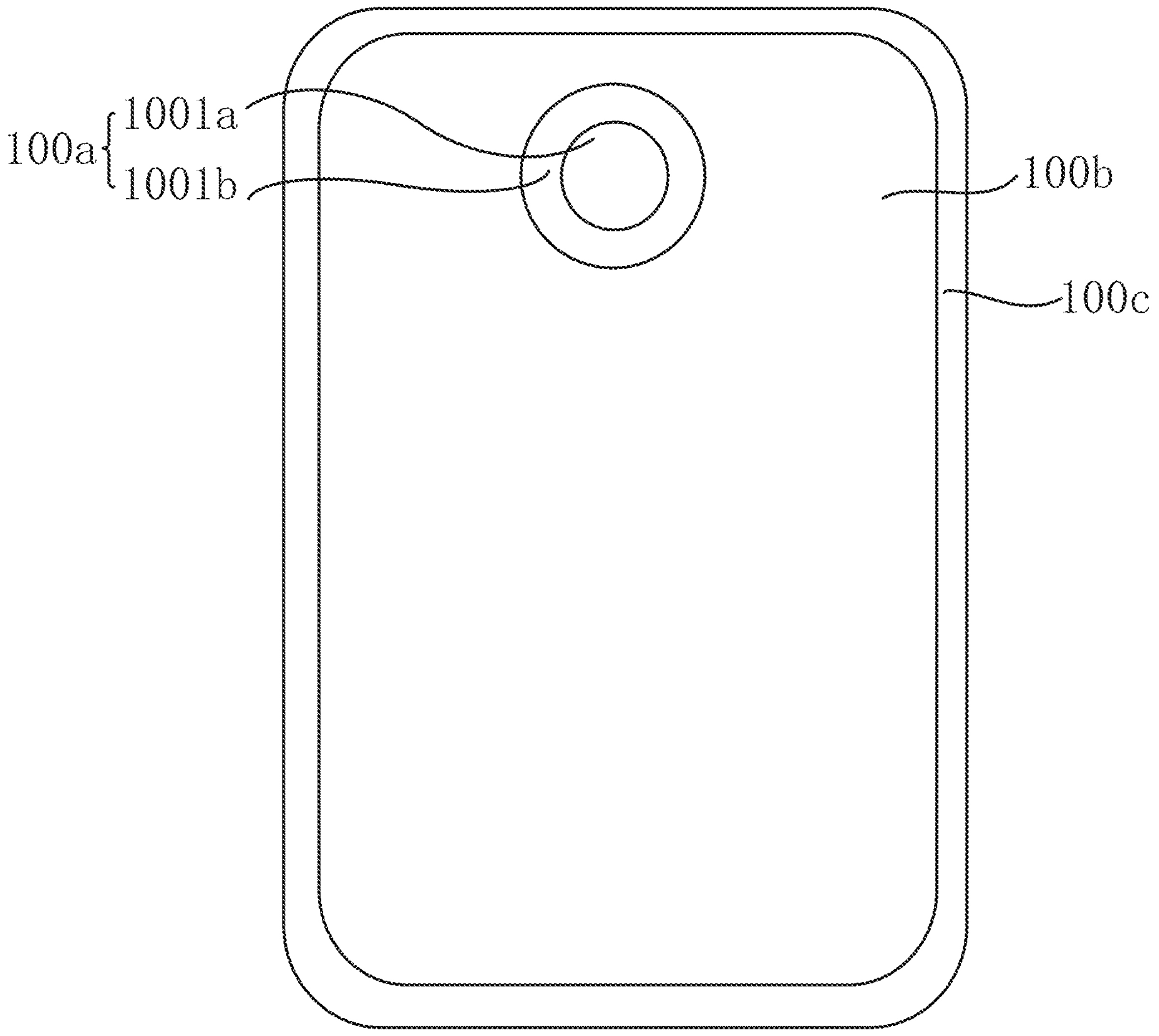
FIG. 1 is a schematic plan structural view of display panel of an embodiment of the present application.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as “upper” and “lower”, when are not specified to the contrary explanation, usually refer to the upper and lower states of the device in actual use or working conditions, specifically according to the direction of the figures in the drawings. Furthermore, “inner” and “outer” refer to the outline of the device.

With reference to FIG. 1, an embodiment of the present invention provides a display panel, and the display panel comprises a function add-on region 100*a*, a main display region 100*b*, and a non-display region 100*c*. The main display region 100*b* is located on an outer periphery of the function add-on region 100*a*. The non-display region 100*c* is located on an outer periphery of the main display region 100*b*. The function add-on region 100*a* comprises a light transmission display region 1001*a* and a transition display region 1001*b* located on an outer periphery of the light transmission display region 1001*a*.

Optionally, the display panel can comprise the function add-on region 100*a*, a shape of each of the function add-on region 100*a* in a top view is not limited to circle, rectangle, and rounded rectangle.

With reference to FIGS. 1 and 2, FIGS. 3A to 3B, and FIGS. 4A to 4C, the display panel comprises a plurality of pixel rows, a plurality of auxiliary pixel driver circuits 100, a plurality of main pixel driver circuits 200 and gate electrode driver circuits 300 in levels. The pixel rows comprise a plurality of complex pixel rows 101 and a plurality of main pixel rows 201. Each of the complex pixel rows 101 comprises a plurality of auxiliary sub-pixels 102 located in the function add-on region 100*a* and a plurality of main sub-pixels 202 located in the main display region 100*b*. Each of the main pixel rows 201 comprises the main sub-pixels 202 located in the main display region 100*b*.

Each of the auxiliary pixel driver circuits 100 is connected to the auxiliary sub-pixels 102 and is configured to drive the auxiliary sub-pixels 102 to emit light. The auxiliary pixel driver circuits 100 are located in the function add-on region 100*a*. Furthermore, the auxiliary pixel driver circuits 100 are located in the transition display region 1001*b*. A plurality of pixel driver circuit islands 110 are disposed in the transition display region 1001*b*. The pixel driver circuit islands 110 are disposed along an edge of the light transmission display region 1001*a*, and each of the pixel driver circuit islands 110 comprises plural ones of the auxiliary pixel driver circuits 100 to integrate the auxiliary pixel driver circuits 100 driving the auxiliary sub-pixels 102 located in the function add-on region 100*a* to emit light into the pixel driver circuit islands to be distributed in the transition display region 1001*b* such that light transmittance of the light transmission display region 1001*a* is enhanced.

The main pixel driver circuits 200 are located in the main display region 100*b*. Each of the main pixel driver circuits 200 is connected to a corresponding one of the main sub-pixels 202 and is configured to drive a corresponding one of the main sub-pixels 202 to emit light.

The gate electrode driver circuits 300 in levels is located in the non-display region 100*c*. The gate electrode driver circuits 300 in levels are connected to the auxiliary pixel driver circuits 100 and the main pixel driver circuits 200 respectively through a plurality of scan signal lines 400, and are configured to provide the auxiliary pixel driver circuits 100 and the main pixel driver circuits 200 with scan signals.

Each of the scan signal lines 400 comprises main scan signal lines 401 of a number P and auxiliary scan signal lines 402 of a number Q. The auxiliary scan signal lines 402 of the number Q comprise first auxiliary scan signal lines 4021 of a number Z and second auxiliary scan signal lines 4022 of a number (Q−Z). Each of the main pixel driver circuits 200 is connected to a corresponding one of the gate electrode driver circuits 300 through a corresponding one of the main scan signal lines 401. Each of the auxiliary pixel driver circuits 100 is connected to a corresponding one of the main scan signal lines 40 through the first auxiliary scan signal lines 40211 to be connected to a corresponding one of the gate electrode driver circuits 300. An end of each of the second auxiliary scan signal lines 4022 is connected to a corresponding one of the main scan signal lines 401, another end of the second auxiliary scan signal line 4022 floats. $P \geq Q$, $P \geq 2$, $Q \geq 1$, $Q \geq Z$, $Z \geq 1$, and P, Q, and Z are integers.

It can be understood that, for the auxiliary scan signal lines 402 of each of the scan signal lines 400, the first auxiliary scan signal lines 4021 in the auxiliary scan signal lines 402 is connected to a corresponding one of the auxiliary pixel driver circuits 100. An end of the second auxiliary scan signal line 4022 of the auxiliary scan signal lines 402 is connected to a corresponding one of the main scan signal lines 401, another end of the second auxiliary scan signal line 4022 floats without being connected to any one of the first auxiliary scan signal lines 4021 and the auxiliary pixel driver circuits 100. In other words, one end of the second auxiliary scan signal line 4022 is broken such that in a common boundary between the main display region 100*b* and the function add-on region 100*a* of the display panel. For the broken second auxiliary scan signal line 4022, there is no need to dispose a connection wire connecting adjacent two or more of the auxiliary scan signal lines 402 such that a coupling effect easily occurring between the connection wire and the pixel driver circuit.

Optionally, the auxiliary sub-pixels 102 and the main sub-pixels 202 comprise an organic light emitting diode, a micro light emitting diode, and a mini light emitting diode.

Optionally, the main sub-pixels 202 located in the same pixel row can be in the same horizontal line, or the main sub-pixels 202 and the auxiliary sub-pixels 102 can be in the same horizontal line. Namely, with reference to FIG. 3A, the main sub-pixels 202 located in the same main pixel row 201 are located in the same horizontal line. The main sub-pixels 202 and the auxiliary sub-pixels 102 located in the same complex pixel row 101 are located in the same horizontal line.

Optionally, some of the main sub-pixels 202 located in the same pixel row are located in the same horizontal line, or some of the main sub-pixels 202 and some of the auxiliary sub-pixels 102 are located in the same horizontal line. Namely, with reference to FIG. 3B, some of the main sub-pixels 202 located the same main pixel row 201 are located in the same horizontal line. Some of the main sub-pixels 202 and some of the auxiliary sub-pixels 102 located in the same complex pixel row 101 are located in the same horizontal line.

Figure 3A:
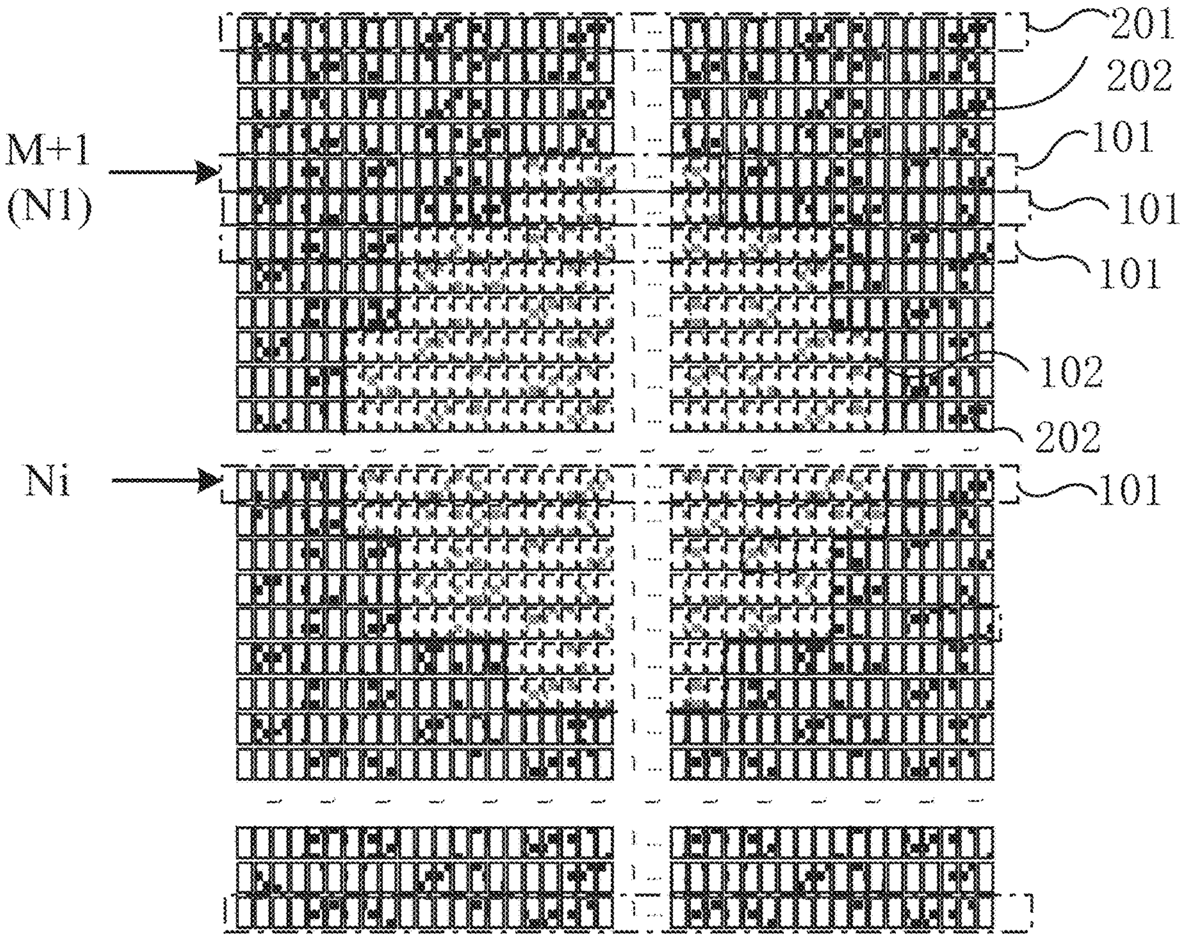
FIGS. 3A and 3B are schematic structural views of layouts of auxiliary sub-pixels and main sub-pixels provided by the embodiment of present application.
Figure 3B:
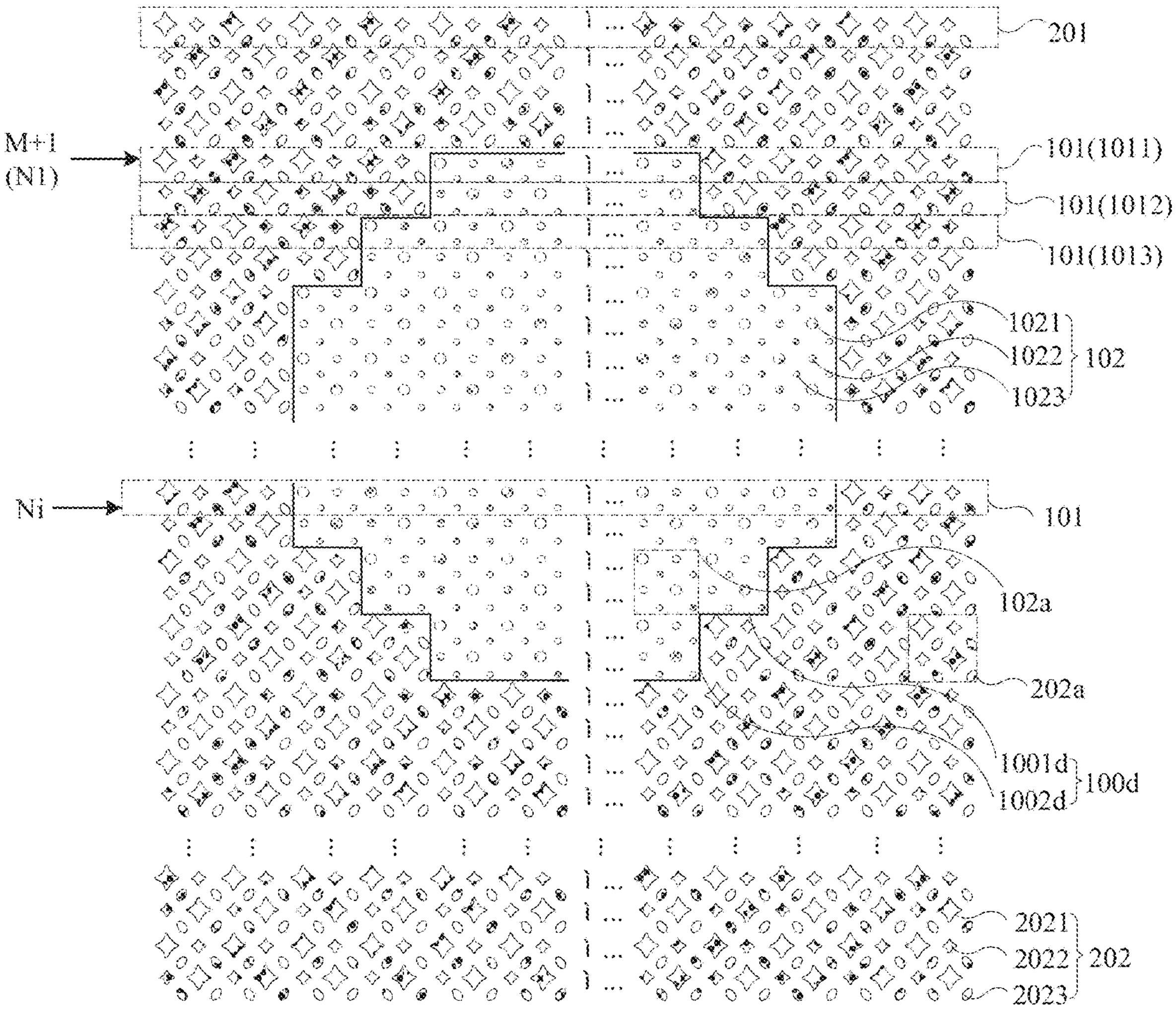

Specifically, with further reference to FIG. 3B, the main sub-pixels 202 comprises the first main sub-pixels 2021, the second main sub-pixels 2022, and the third main sub-pixels 2023 that emit different colors. The auxiliary sub-pixels 102 comprises a plurality of first auxiliary sub-pixels 1021 with a light emission color the same as that of the first main sub-pixels 2021, a plurality of second auxiliary sub-pixels 1022 with a light emission color the same as that of the second main sub-pixels 2022, and a plurality of third auxiliary sub-pixels 1023 with a light emission color the same as that of the third main sub-pixels 2023. The first main sub-pixels 2021 and the second main sub-pixels 2022 located in the same main pixel row 201 are located in the same horizontal line. The third main sub-pixels 2023 are located in another horizontal line. The first main sub-pixels 2021, the second main sub-pixels 2022 located in the same complex pixel row 101 and the first auxiliary sub-pixels 1021 and the second auxiliary sub-pixels 1022 are located in the same horizontal line. The third main sub-pixels 2023 and the third auxiliary sub-pixels 1023 are located in another horizontal line.

Optionally, light emission colors of the first main sub-pixels 2021, the second main sub-pixels 2022, and the third main sub-pixels 2023 comprise red, blue, green, yellow, white, etc. Furthermore, the light emission color of the first main sub-pixels 2021 is blue, the light emission color of the second main sub-pixels 2022 is red, and the light emission color of the third main sub-pixels 2023 is green.

Furthermore, with further reference to FIGS. 3A to 3B, arrangements of the auxiliary sub-pixels 102 located in the function add-on region 100*a* and the main sub-pixels 202 located in the main display region 100*b* are the same, which can further lower display difference between the main display region 100*b* and the function add-on region 100*a* without increasing process difficulty to further mitigate an issue of display unmatching of the display panel.

Specifically, the display panel comprises a plurality of main pixel units 202*a* and a plurality of auxiliary pixel units 102*a*. Each of the main pixel units 202*a* comprises the main sub-pixels 202, each of the auxiliary pixel units 102*a* comprises the auxiliary sub-pixels 102. A number of the main sub-pixels 202 included by each of the main pixel units 202*a* and an arrangement form of the main sub-pixels 202 are the same as a number of the auxiliary sub-pixels 102 included by each of the auxiliary pixel units 102*a* and an arrangement form of the auxiliary sub-pixels 102.

Optionally, each of the main pixel units 202*a* comprises the first main sub-pixels 2021, the second main sub-pixels 2022, and the third main sub-pixels 2023. Each of the auxiliary pixel units 102*a* comprises the first auxiliary sub-pixels 1021, the second auxiliary sub-pixels 1022, and the third auxiliary sub-pixels 1023. Adjacent two of the main pixel units 202*a* are arranged in a mirroring arrangement or a symmetrical arrangement in the main display region 100*b*, and adjacent two of the auxiliary pixel units 102*a* are arranged in a mirroring arrangement or a symmetrical arrangement in the function add-on region 100*a*.

Furthermore, the first main sub-pixels 2021, the second main sub-pixels 2022, and the third main sub-pixels 2023 can employ a standard RGB arrangement, and can also employ a pearl arrangement. Accordingly, the first auxiliary sub-pixels 1021, the second auxiliary sub-pixels 1022, and the third auxiliary sub-pixels 1023 employ a standard RGB arrangement, or employ a pearl arrangement.

Optionally, at least one of the first main sub-pixels 2021 located in the same main pixel units 202*a* and at least one of the second main sub-pixels 2022 and at least one third main sub-pixels 2023 are located in the same main pixel row 201. At least one of the first auxiliary sub-pixels 1021 located in the same auxiliary pixel units 102*a* and at least one of the second auxiliary sub-pixels 1022 and at least one third auxiliary sub-pixels 1023 are located in the same complex pixel row 101.

Optionally, the main pixel units 202*a* can further comprise fourth main sub-pixels. The auxiliary pixel units 102*a* can further comprise fourth auxiliary sub-pixels.

Figure 2:
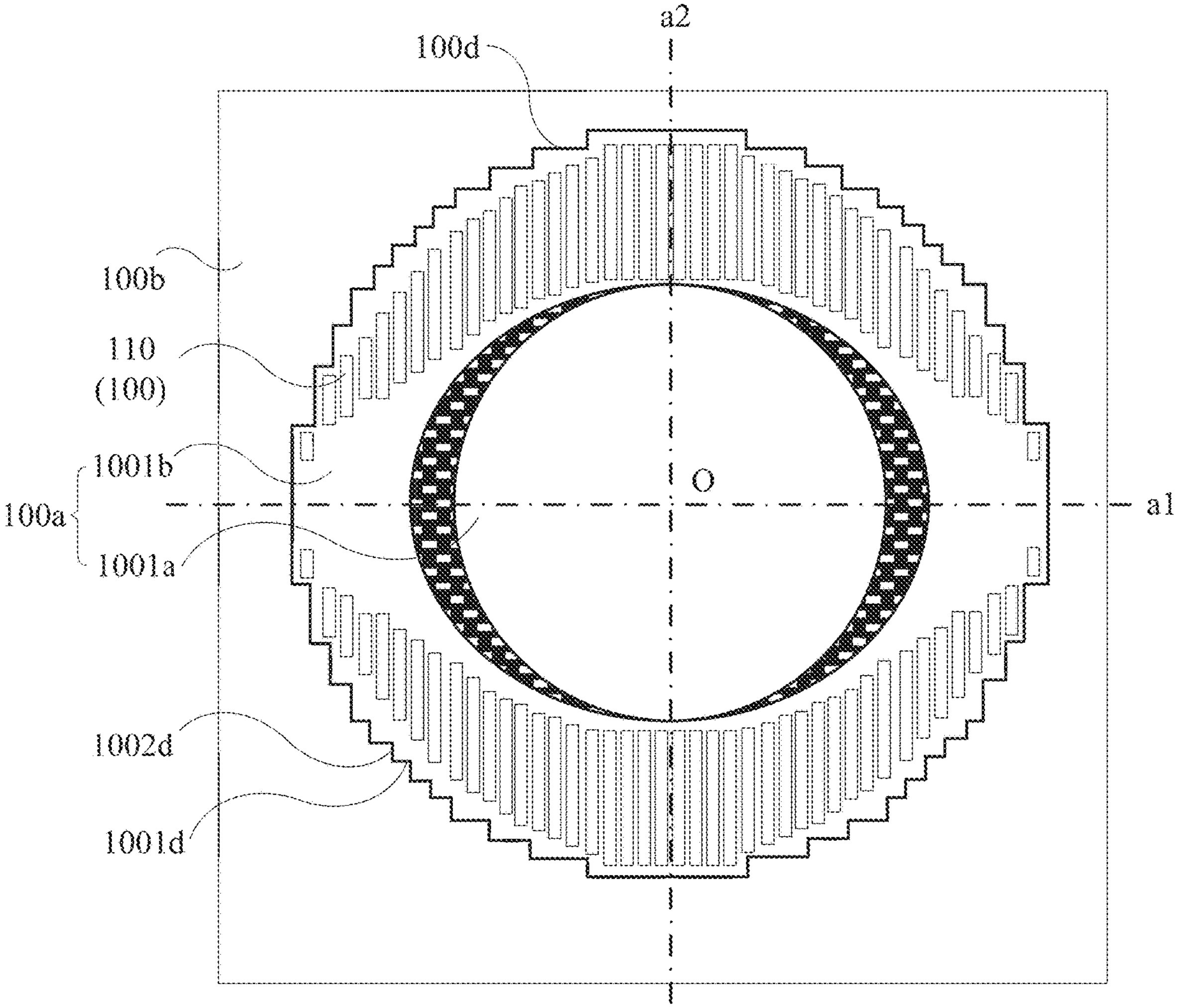
FIG. 2 is a partial enlarged view of a portion A in FIG. 1.

With further reference to FIGS. 2 and 3A to 3B, a folding line boundary 100*d* is defined between the main display region 100*b* and the function add-on region 100*a*. The folding line boundary 100*d* comprises a plurality of perpendicularly intersecting first folding edges 1001*d* and second folding edges 1002*d*. The function add-on region 100*a* has a first symmetrical axis a1 parallel to the first folding edges 1001*d* and a second symmetrical axis a2 parallel to the second folding edges 1002*d* and intersecting the first symmetrical axis a1. An intersection point O of the first symmetrical axis a1 and the second symmetrical axis a2 is located in a center of the function add-on region 100*a*. Each of the first folding edges 1001*d* and each of the second folding edges 1002*d* that intersects each other correspond to at least one of the auxiliary pixel units 102*a* to guarantee structural entirety of the auxiliary pixel units 102*a* near the folding line boundary 100*d*, lower display difference of portions of the main display region 100*b* and the function add-on region 100*a* near the folding line boundary 100*d*.

Furthermore, each of the first folding edges 1001*d* comprises a first length, and the first lengths of the first folding edges 1001*d* decrease sequentially along a direction away from the second symmetrical axis a2. Each of the second folding edges 1002*d* has a first height, and the first heights of the second folding edges 1002*d* decrease sequentially along a direction away from the first symmetrical axis a1.

With further reference to FIGS. 1, 2 and 3A to 3B, the main sub-pixels 202 located in the main pixel rows 201 can be driven by a corresponding one of the main pixel driver circuits 200 to emit light, and the complex pixel rows 101 is adjacent to the main pixel rows 201. Specifically, the main pixel rows 201 can be located on at least one side of the complex pixel rows 101. Furthermore, the complex pixel rows 101 can be located among the main pixel rows 201, as shown in FIGS. 3A to 3B. Namely, the complex pixel rows 101 can be located before a first one of the main pixel rows 201. Alternatively, the complex pixel rows 101 can be located after a last one of the main pixel rows 201. Alternatively, the complex pixel rows 101 can be located before a certain one of the main pixel rows 201.

Specifically, an end of each of the second auxiliary scan signal lines 4022 is connected to a corresponding one of the main scan signal lines 401 in the main display region 100*b*, and another end of the second auxiliary scan signal line 4022 floats in the transition display region 1001*b*.

Figure 4A:
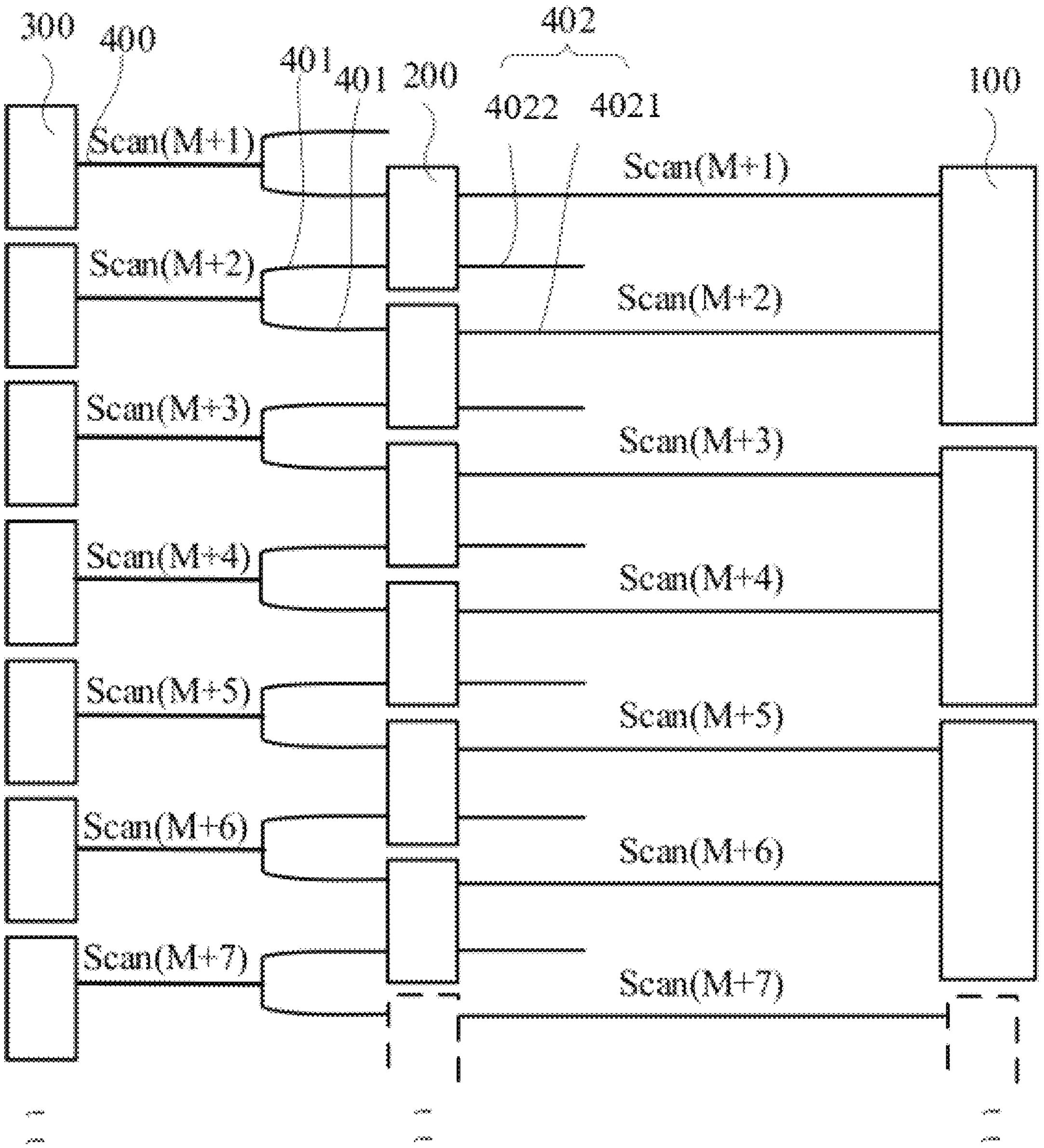
FIGS. 4A, 4B and 4C are schematic connection views of gate electrode driver circuits, main pixel driver circuits, auxiliary pixel driver circuits provided by the embodiment of the present application.
Figure 4B:
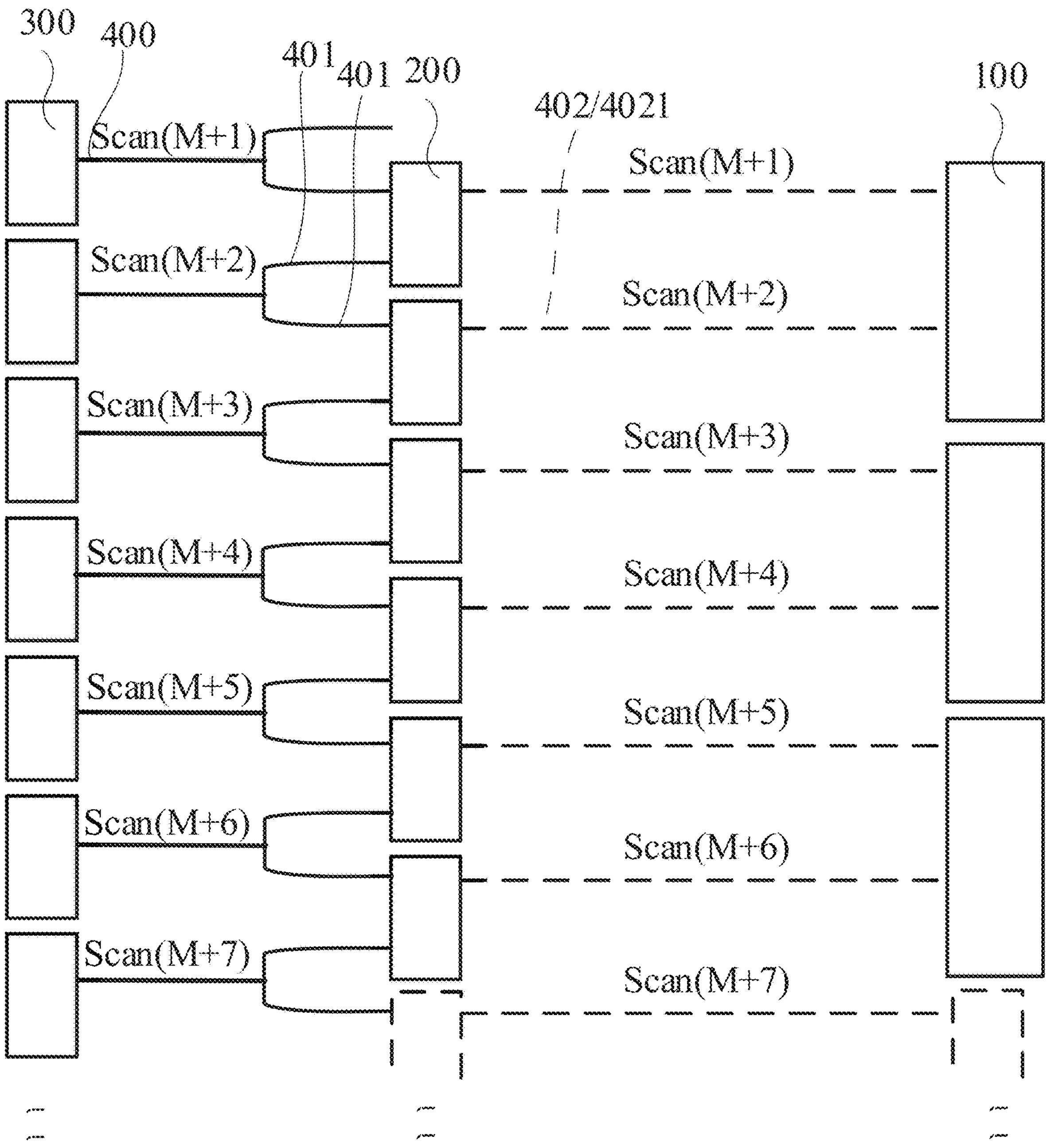
Figure 4C:
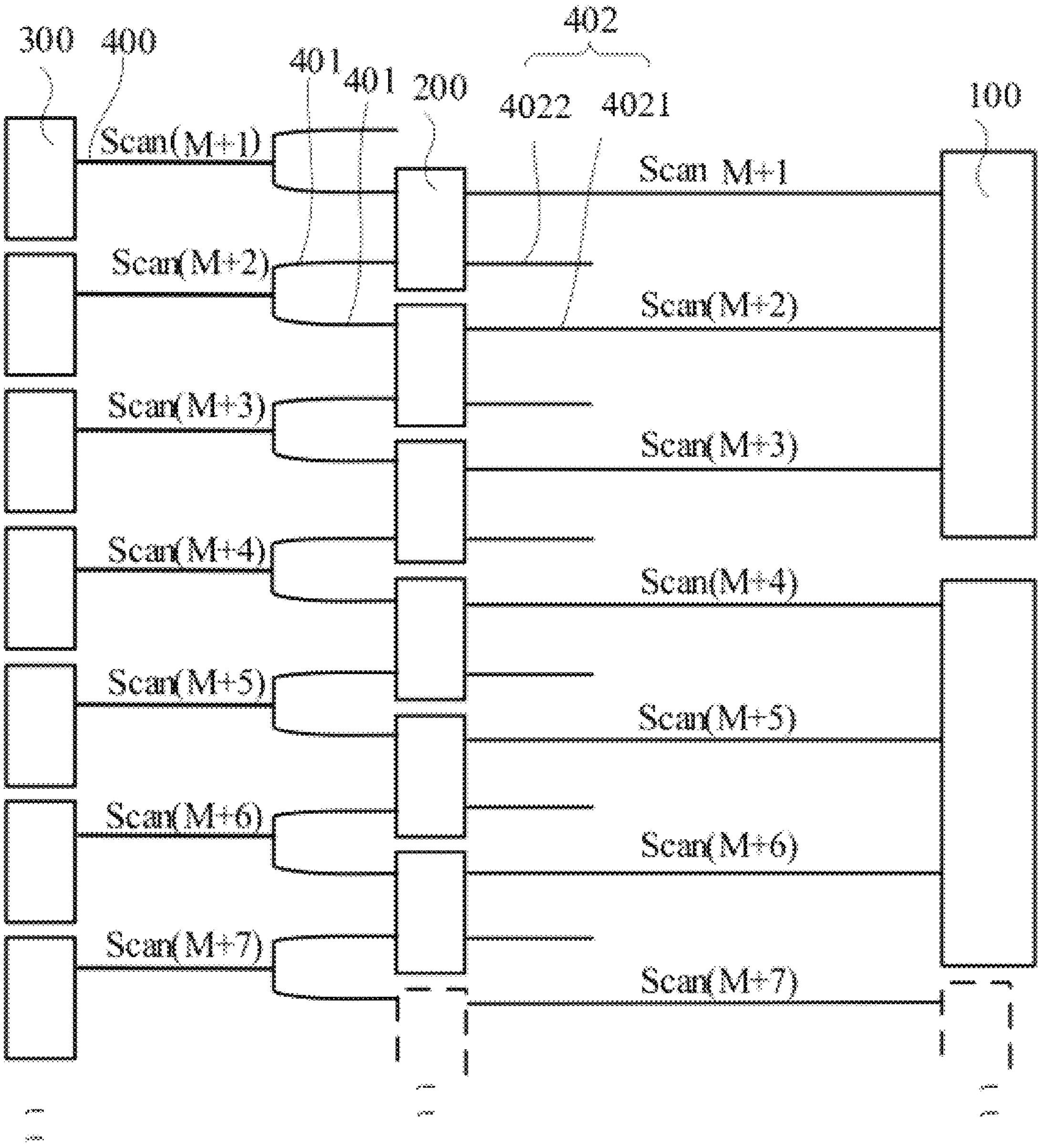

With reference to FIGS. 4A to 4C, in an embodiment, Z=1, namely, the auxiliary scan signal lines 402 of a number Q comprise one first auxiliary scan signal line 4021 and second auxiliary scan signal lines 4022 of a number (Q−1). Each of the auxiliary pixel driver circuits 100 is connected to a corresponding one of the main scan signal lines 401 through the first auxiliary scan signal line 4021 to be connected to a corresponding one of the gate electrode driver circuits 300. An end of each of the second auxiliary scan signal lines 4022 of the number (Q−1) is connected to a corresponding one of the main scan signal lines 401, and another end of the second auxiliary scan signal line 4022 floats. In other words, for the auxiliary scan signal lines 402 in the scan signal lines 400 in the same level, only one first auxiliary scan signal line 4021 is electrically connected to the auxiliary pixel driver circuits 100, remains of the first auxiliary scan signal lines 4021 float without electrical connection with the auxiliary pixel driver circuits 100. Therefore, there is no need to dispose a connection wire configured to the floating second auxiliary scan signal lines 4022 and the normally disposed first auxiliary scan signal lines 4021 such that a coupling effect easily occurring between the connection wire and the pixel driver circuit can be prevented, which facilitates improvement of the display effect.

With reference to FIGS. 4A and 4C, in an embodiment, P=2, Q=2. Namely, the scan signal lines 400 of each level comprises two main scan signal lines 401 and two auxiliary scan signal lines 402. The two auxiliary scan signal lines 402 comprise one first auxiliary scan signal lines 4021 and one second auxiliary scan signal line 4022, each of the auxiliary pixel driver circuits 100 is connected to a corresponding one of the main scan signal lines 401 through one first auxiliary scan signal lines 4021 to be connected to a corresponding one of the gate electrode driver circuits 300. An end of one second auxiliary scan signal lines 4022 is connected to a corresponding one of the main scan signal lines 401, another end of the second auxiliary scan signal lines 4022 floats. In other words, for two auxiliary scan signal lines 402 in the scan signal lines 400 in the same level, one of the auxiliary scan signal lines 402 is electrically connected to the auxiliary pixel driver circuits 100, the other of the first auxiliary scan signal lines 4021 floats without electrical connection with the auxiliary pixel driver circuits 100. Clearly, there is no need to dispose a connection wire configured to the floating second auxiliary scan signal lines 4022 and the normally disposed first auxiliary scan signal lines 4021 such that a coupling effect easily occurring between the connection wire and the pixel driver circuit can be prevented, which facilitates improvement of the display effect.

With reference to FIG. 4B, in an embodiment, P=2, Q=1. Namely, the scan signal lines 400 of each level comprise two main scan signal lines 401 and one auxiliary scan signal line 402. The auxiliary scan signal line 402 is the first auxiliary scan signal line 4021, and each of the auxiliary pixel driver circuits 100 is connected to a corresponding one of the main scan signal lines 401 through one first auxiliary scan signal line 4021 to be connected to a corresponding one of the gate electrode driver circuits 300. In other words, the scan signal lines 400 in the same level only include one first auxiliary scan signal line 4021. Clearly, there is no need to dispose a connection wire configured to the floating second auxiliary scan signal lines 4022 and the normally disposed first auxiliary scan signal lines 4021 such that a coupling effect easily occurring between the connection wire and the pixel driver circuit can be prevented, which facilitates improvement of the display effect.

Because the gate electrode driver circuits 300 according to different locations of the main pixel rows 201 and the complex pixel rows 101, would provide different scan signals to the main pixel driver circuits 200 driving the main sub-pixels 202 located in the main pixel rows 201 to emit light, the main pixel driver circuits 200 driving the main sub-pixels 202 located in the complex pixel rows 101 to emit light, and the auxiliary pixel driver circuits 100 driving the auxiliary sub-pixels 102 located in the complex pixel rows 101 to emit light. Therefore, for convenience of description, the complex pixel rows 101 located after a Mth one of the main pixel rows 201 (namely, a first pixel row to Mth one of the pixel rows are the main pixel rows 201, and the (M+1)th one of the pixel rows is a first one of the complex pixel rows) are taken as an example for explanation of a working principle of the display panel. The complex pixel rows 101 are located after last one of the main pixel rows 201. A working principle of the display panel with the complex pixel rows 101 located before the first one of the main pixel rows 201 or a certain one of the main pixel rows 201 can refer to a working principle of the display panel with the complex pixel rows 101 located after the Mth one of the main pixel rows 201, and will not be described repeatedly here.

Specifically, when a (M+1)th one of the pixel rows is a first one of the complex pixel rows 101, in the first auxiliary scan signal lines 4021 connected to the auxiliary pixel driver circuits 100 connected to the auxiliary sub-pixels 102 in an ith one of the complex pixel rows, the first auxiliary scan signal lines 4021 corresponding to the scan signal lines of a Nith level are connected to the main pixel driver circuits 200 connected to the main sub-pixels 202 located in the ith one of the complex pixel rows. Ni=M+i, i≥1.

For example, when a first one of the pixel rows is a first one of the complex pixel rows 101, in the first auxiliary scan signal lines 4021 connected to the auxiliary pixel driver circuits 100 connected to the auxiliary sub-pixels 102 located in the first one of the complex pixel rows, the first auxiliary scan signal lines 4021 corresponding to the scan signal lines 400 of a first level are connected to the main pixel driver circuits 200 connected to the main sub-pixels 202 located in the first one of the complex pixel rows. In the first auxiliary scan signal lines 4021 connected to the auxiliary pixel driver circuits 100 connected to the auxiliary sub-pixels 102 located in a second one of complex pixel rows, the first auxiliary scan signal lines 4021 corresponding to the scan signal lines 400 of a second level are connected to the main pixel driver circuits 200 connected to the main sub-pixels 202 located in the second one of the complex pixel rows.

Furthermore, when (M+1)th one of the pixel rows is a first one of the complex pixel rows 101, the auxiliary sub-pixels located in pth to qth ones of the complex pixel rows 101 are the auxiliary sub-pixels located in Npth to Nqth the pixel rows. The auxiliary pixel driver circuits 100 connected to the auxiliary sub-pixels 102 located in pth to qth ones of the complex pixel rows are connected to the scan signal lines of a Npth level, the scan signal lines of a (Np+Y)th level, and the scan signal lines of a Nqth level. the main pixel driver circuits 200 corresponding to the main sub-pixels 202 located in ith one of the complex pixel rows are connected to the scan signal lines of a Nith level and the scan signal lines of a (Ni+1)th level. Np=M+p, Nq=M+q, Ni=M+i; 0<Y<Nq−Np; p≤i≤q.

The main pixel driver circuits 200 corresponding to the main sub-pixels 202 located in a Nith one of the pixel rows are the main pixel driver circuits 200 corresponding to the main sub-pixels 202 located in the ith one of the complex pixel rows. The main pixel driver circuits 200 corresponding to the main sub-pixels 202 located in the ith one of the complex pixel rows are connected to the scan signal lines of the Nith level S(Ni) and the scan signal lines of a (Ni+1)th level S(Ni+1).

One of the auxiliary pixel driver circuits 100 located in the function add-on region **100*a* can be connected to the auxiliary sub-pixels 102 of the complex pixel rows 101. For example, With reference to FIGS. 4A and 4B, one of the auxiliary pixel driver circuits 100 located in the function add-on region 100*a* is connected to the auxiliary sub-pixels 102 located in two of the complex pixel rows 101. For another example, with reference to FIG. 4C, each of the auxiliary pixel driver circuits 100 is connected to the auxiliary sub-pixels 102 located in three of the complex pixel rows 101**.

For convenience of understanding, with reference to FIGS. 4A and 4B, one of the auxiliary pixel driver circuits 100 located in the function add-on region **100*a* is connected to the auxiliary sub-pixels 102 located in two of the complex pixel rows 101, and a fourth one of the pixel rows is the first one of the complex pixel rows (i.e., M=3) in the complex pixel rows 101**, which are taken as an example for explanation.

Specifically, when one of the auxiliary pixel driver circuits 100 located in the function add-on region **100*a* is connected to the auxiliary sub-pixels 102 located in the first one of the complex pixel rows 1011 and the second one of the complex pixel rows 1012 (i.e., p=1, q=2) (i.e., connection with the auxiliary sub-pixels 102 of fourth to fifth ones of the pixel rows, i.e., N1=M+1=4, N2=M+2=5, 0<Y<N2−N1), the auxiliary pixel driver circuits 100 are connected to the scan signal lines of a N1th level, the scan signal lines of a (N1+Y)th, and the scan signal lines of a N2th level, which means that the auxiliary pixel driver circuits 100 are connected to the scan signal lines S(4) of a fourth level and the scan signal lines S(5**) of a fifth level.

When one of the auxiliary pixel driver circuits 100 located in the function add-on region **100*a* are connected to the auxiliary sub-pixels 102 located in third to fourth ones of the complex pixel rows (i.e., p=3, q=4) (i.e., connection with the auxiliary sub-pixels 102 located in the sixth to seven ones of the pixel rows, i.e., N3=M+3=6, N4=M+4=7, 0<Y<N4−N3), the auxiliary pixel driver circuit 100 is connected to the scan signal lines of a N3th level, the scan signal lines of a (N3+Y)th level and the scan signal lines of a N4th level are connected to the scan signal lines of a sixth level S(6) and the scan signal lines of a seventh level S(7**).

The scan signal lines connected to auxiliary pixel driver circuits connected to the auxiliary sub-pixels 102 located in a first one of the complex pixel rows 1011 to a second one of the complex pixel rows 1012 (i.e., p=1, q=2) are: S(4), S(5). The scan signal lines connected to auxiliary pixel driver circuits connected to the auxiliary sub-pixels 102 located in the third to fourth ones of the complex pixel rows (i.e., p=3, q=4) are: S(6), S(6), S(7).

It can be understood that when one of the auxiliary pixel driver circuits 100 located in the function add-on region **100*a* is connected to the auxiliary sub-pixels 102 located in a pth one of the complex pixel rows to a qth one of the complex pixel rows (i.e., connection with the auxiliary sub-pixels 102 located in Npth to Nqth ones of the pixel rows), the auxiliary pixel driver circuit 100** is connected to the scan signal lines of a Npth level, the scan signal lines of a (Np+Y)th level, and the scan signal lines of a Nqth level, wherein Np=M+p, Nq=M+q, 0<Y<Nq−Np.

Similarly, with reference to FIG. 4C, connection of one of the auxiliary pixel driver circuits 100 located in the function add-on region **100*a* and the auxiliary sub-pixels 102 located in three of the complex pixel rows 101** is taken as an example for explanation.

Specifically, when one of the auxiliary pixel driver circuits 100 is connected to the auxiliary sub-pixels 102 located in the first one of the complex pixel rows 1011 to the third one of the complex pixel rows 1013 (i.e., p=1, q=3) (i.e., connection with the auxiliary sub-pixels 102 located in fourth to sixth ones of the pixel rows, i.e., N1=M+1=4, N3=M+3=6, 0<Y<N3−N1, then Y=1), the auxiliary pixel driver circuit 100 is connected to the scan signal lines of the N1th level, the scan signal lines of a (N1+Y)th level, and the scan signal lines of a N3th level, which means that the auxiliary pixel driver circuit 100 is connected to the scan signal lines of the fourth level S(4), the scan signal lines of the fifth level S(5), and the scan signal lines of the sixth level S(6).

When one of the auxiliary pixel driver circuits 100 located in the function add-on region 100*a* is connected to the auxiliary sub-pixels 102 located in a fourth complex pixel row to a sixth complex pixel row (i.e., p=4, q=6) (i.e., connection with the auxiliary sub-pixels 102 located in a seventh one of the pixel rows to a ninth one of the pixel rows, i.e., N4=M+4=7, N6=M+6=9, 0<Y<N6−N4, then Y=1), the auxiliary pixel driver circuit 100 is connected to the scan signal lines of the fourth level, the scan signal lines of a (N4+Y)th level, and the scan signal lines of a N6th level, which means that the auxiliary pixel driver circuit 100 is connected to the scan signal lines of the seventh level S(7), the scan signal lines S(8) of an eighth level, and the scan signal lines of a ninth level S(9).

The scan signal lines connected to the auxiliary pixel driver circuits connected to the auxiliary sub-pixels 102 located in the first one of the complex pixel rows 1011 to the third one of the complex pixel rows 1012 (i.e., p=1, q=3) are: S(4), S(5), S(6). The scan signal lines connected to the auxiliary pixel driver circuits connected to the auxiliary sub-pixels 102 located in a fourth one of the complex pixel rows to a sixth one of the complex pixel rows (i.e., p=4, q=6) are: S(7), S(8), S(9).

According to the above analysis it is concluded as follows: when one of the auxiliary pixel driver circuits 100 in the auxiliary pixel driver circuits 100 is connected to the auxiliary sub-pixels 102 located in pth to qth ones of the complex pixel rows (i.e., connection with the auxiliary sub-pixels 102 located in Npth to Nqth ones of the pixel rows), the auxiliary pixel driver circuit 100 is connected to the scan signal lines of a Npth level, the scan signal lines of a (Np+Y)th level, and the scan signal lines of a Nqth level. Np=M+p, Nq=M+q, 0<Y<Nq−Np.

Similarly, an embodiment solution of one of the auxiliary pixel driver circuits 100 in the auxiliary pixel driver circuits 100 connected to the auxiliary sub-pixels 102 located in the complex pixel rows 101 (for example, q−p+1≥4) can also be obtained, which will not be described repeatedly here.

With reference to FIGS. 4A and 4B, each of the auxiliary pixel driver circuits 100 drives the auxiliary sub-pixels 102 of two of the complex pixel rows (i.e., q−p+1=2) to emit light, and the gate electrode driver circuit 30 provides the auxiliary pixel driver circuits 100 driving the auxiliary sub-pixels 102 located in a first one to the second one of the complex pixel rows 101 (i.e., p=1, q=2, N1=M+1, N2=M+2, 0<Y<q−p) to emit light with the scan signal of a (M+1)th level Scan(M+1) and the scan signal of (M+2)th level Scan(M+2). The gate electrode driver circuit 300 provides the auxiliary pixel driver circuits 100 driving the auxiliary sub-pixels 102 located in third to fourth ones of the complex pixel rows 101 (i.e., p=3, q=4, N3=M+3, N4=M+4) to emit light with the scan signal of a (M+3)th level Scan(M+3) and the scan signal of a (M+4)th level Scan(M+4). Accordingly, the gate electrode driver circuit 300 provides the auxiliary pixel driver circuits 100 driving the auxiliary sub-pixels 102 located in pth to qth ones of the complex pixel rows 101 (i.e., Np=M+p, Nq=M+q) to emit light with the scan signal of a (M+p)th level Scan(M+p), the scan signal of a (M+p+Y)th level Scan(M+p+Y), and the scan signal of a (M+q)th level Scan(M+q).

With reference to FIG. 4C, when each of the auxiliary pixel driver circuits 100 drives the auxiliary sub-pixels 102 of three of the complex pixel rows (i.e., q−p+1=3) to emit light, the gate electrode driver circuit 300 provides the auxiliary pixel driver circuits 100 driving the auxiliary sub-pixels 102 located in first to third ones of the complex pixel rows 101 (i.e., p=1, q=3, Np=M+1, Nq=M+3, Y<q−p) to emit light with the scan signal of the (M+1)th level Scan(M+1), the scan signal of the (M+2)th level Scan(M+2), the scan signal of the (M+3)th level Scan(M+3). The gate electrode driver circuit 300 provides the auxiliary pixel driver circuits 100 driving the auxiliary sub-pixels 102 located in fourth to sixth ones of the complex pixel rows 101 (i.e., p=4, q=6, Np=M+4, Nq=M+6) to emit light with the scan signal of (M+4)th level Scan(M+4), the scan signal of a (M+5)th level Scan(M+5), and the scan signal of a (M+6)th level Scan(M+6). Accordingly, the gate electrode driver circuit 300 provides the auxiliary pixel driver circuits 100 driving the auxiliary sub-pixels 102 located in pth to qth ones of the complex pixel rows 101 (i.e., Np=M+p, Nq=M+q) to emit light with the scan signal of the (M+p)th level Scan(M+p), the scan signal of the (M+p+Y)th level Scan (M+p+Y), and the scan signal of the (M+q)th level Scan (M+q).

Specifically, each of the main pixel driver circuits is connected to the gate electrode driver circuits of a number X1, and each of the auxiliary pixel driver circuits is connected to the gate electrode driver circuits of a number X2. X1≥2, X2≥2, X2≥X1.

Figure 5:
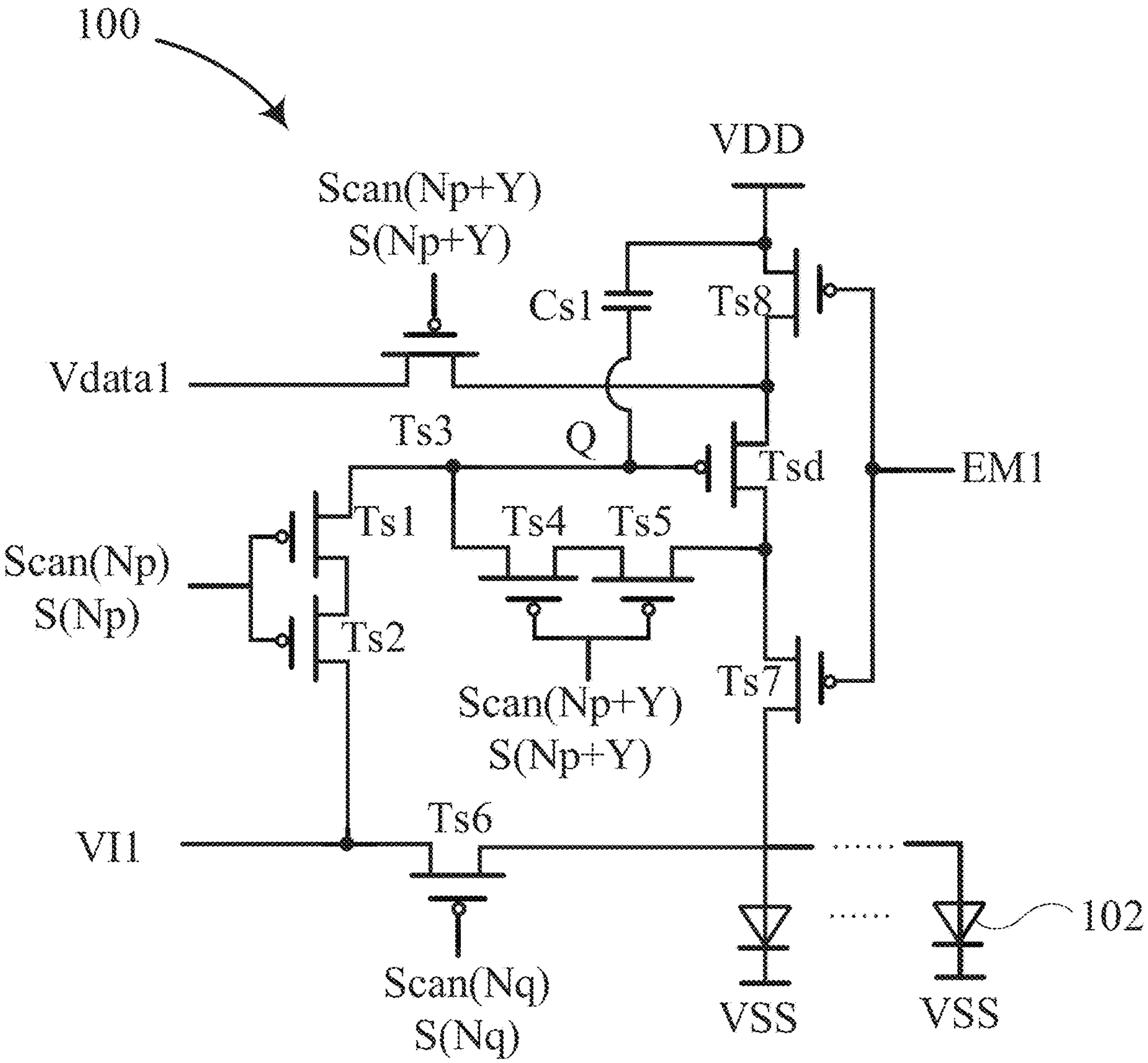
FIG. 5 is a schematic structural view of the auxiliary pixel driver circuit provided by the embodiment of the present application.

With reference to FIG. 5, still taking a (M+1)th one of the pixel rows as a first one of the complex pixel rows as an example for explanation. The auxiliary pixel driver circuit connected to the auxiliary sub-pixels located in pth to qth ones of the complex pixel rows comprises: a first driver module, a first initialization module, a first data writing module, a first reset module, and a first compensation module.

The first driver module comprises an auxiliary driver transistor Tsd.

The first initialization module is connected between a first reset voltage end VI1 and a gate electrode of the auxiliary driver transistor Tsd and is configured to transmit a first reset signal to the gate electrode of the auxiliary driver transistor Tsd according to Npth level scan signal Scan(Np)e to initialize a gate electrode voltage of the auxiliary driver transistor Tsd.

The first data writing module is connected between a first data signal line and one of a source electrode and a drain electrode of the auxiliary driver transistor Tsd, and is configured to transmit a first data signal Vdata one of the source electrode and the drain electrode of the auxiliary driver transistor Tsd according to (Np+Y)th level scan signal Scan(Np+Y).

The first reset module is connected between the first reset voltage end VI1 and anodes of corresponding ones of the auxiliary sub-pixels 102 and is configured to transmit the first reset signal to the anodes of the auxiliary sub-pixels 102 according to Nqth level scan signal Scan(Nq+Y) and reset anode voltages of the auxiliary sub-pixels 102.

The first compensation module is connected between the gate electrode of the auxiliary driver transistor Tsd and one of the source electrode or the drain electrode of the auxiliary driver transistor Tsd and is configured to transmit the first data signal Vdata to the gate electrode of the auxiliary driver transistor according to the (Np+Y)th level scan signal Scan (Np+Y) and compensate a threshold voltage of the auxiliary driver transistor Tsd.

The first storage module is connected in series between the gate electrode of the auxiliary driver transistor Tsd and a first voltage end VDD and is configured to maintain the gate electrode voltage of the auxiliary driver transistor Tsd.

The first light emission control module is connected in series to the auxiliary driver transistor Tsd and is configured to control the auxiliary sub-pixels 102 to emit light according to first light emission control signal EM1.

$$Np=M+p,\ Nq=M+q;\ 0<Y<Nq-Np,\ p\geq 1,\ q>p.$$

Specifically, the first initialization module comprises a first initialization transistor Ts1 and a second initialization transistor Ts2. A gate electrode of the first initialization transistor Ts1 is connected to the scan signal lines of an Npth level Scan(Np). A gate electrode of the second initialization transistor Ts2 is connected to the scan signal lines of an Npth level Scan(Np). One of a source electrode and a drain electrode of the first initialization transistor Ts1 is connected to the gate electrode of the auxiliary driver transistor Tsd. One of a source electrode and a drain electrode of the second initialization transistor Ts2 is connected to the first reset voltage end VI1. The other of the source electrode and the drain electrode of the first initialization transistor Ts1 is connected to the other of the source electrode and the drain electrode of the second initialization transistor Ts2.

The first data writing module comprises a first data transistor Ts3. A gate electrode of the first data transistor Ts3 is connected to the scan signal lines of a (Np+Y)th level Scan(Np+Y). One of a source electrode and a drain electrode of the first data transistor Ts3 is connected a first data line Vdata1, the other of the source electrode and the drain electrode of the first data transistor Ts3 is connected to one of a source electrode and a drain electrode of the auxiliary driver transistor Tsd.

The first compensation module comprises a first compensation transistor Ts4 and a second compensation transistor Ts5. A gate electrode of the first compensation transistor Ts4 is connected to the scan signal lines of a (Np+Y)th level Scan(Np+Y). A gate electrode of the second compensation transistor Ts5 is connected to the scan signal lines of a (Np+Y)th level Scan(Np+Y). One of source electrode and drain electrode of the first compensation transistor Ts4 is electrically connected to a gate electrode of the auxiliary driver transistor Tsd. One of a source electrode and a drain electrode of the second compensation transistor Ts5 is connected to the other of the source electrode and the drain electrode of the auxiliary driver transistor Tsd. The other of the source electrode and the drain electrode of the first compensation transistor Ts2 is connected to the other of the source electrode and the drain electrode of the second compensation transistor Ts5.

The first reset module comprises a first reset transistor Ts6. A gate electrode of the first reset transistor Ts6 is connected to the scan signal lines of an Nqth level Scan(Np). One of a source electrode and a drain electrode of the first reset transistor Ts6 is connected to the first reset voltage end VI1, the other of the source electrode and the drain electrode of the first reset transistor Ts6 is connected to the anode of a corresponding one of the auxiliary sub-pixels 102.

The first light emission control module comprises a first switch transistor Ts7 and a second switch transistor Ts8. A gate electrode of the first switch transistor Ts7 is connected to a first light emitting signal control line EM1. One of a source electrode and a drain electrode of the first switch transistor Ts7 is connected to the other of the source electrode and the drain electrode of the auxiliary driver transistor Tsd and the other of the source electrode and the drain electrode of the second compensation transistor Ts8. The other of the source electrode and the drain electrode first switch transistor Ts7 is connected to the anode of a corresponding one of the auxiliary sub-pixels 102. A gate electrode of the second switch transistor Ts8 is connected to the first light emitting signal control line EM1. One of a source electrode and a drain electrode of the second switch transistor Ts8 is connected to the first voltage end VDD. The other of the source electrode and the drain electrode of the second switch transistor Ts8 is connected to one of the source electrode and the drain electrode of the auxiliary driver transistor Tsd and one of the source electrode and the drain electrode of the first data transistor Ts7.

The first storage module comprises a first storage capacitor Cs1, the first storage capacitor Cs1 is connected in series between the first voltage end VDD and the gate electrode of the auxiliary driver transistor Tsd.

A cathode of each of the auxiliary sub-pixels 102 is connected to a second voltage end VSS.

Figure 6:
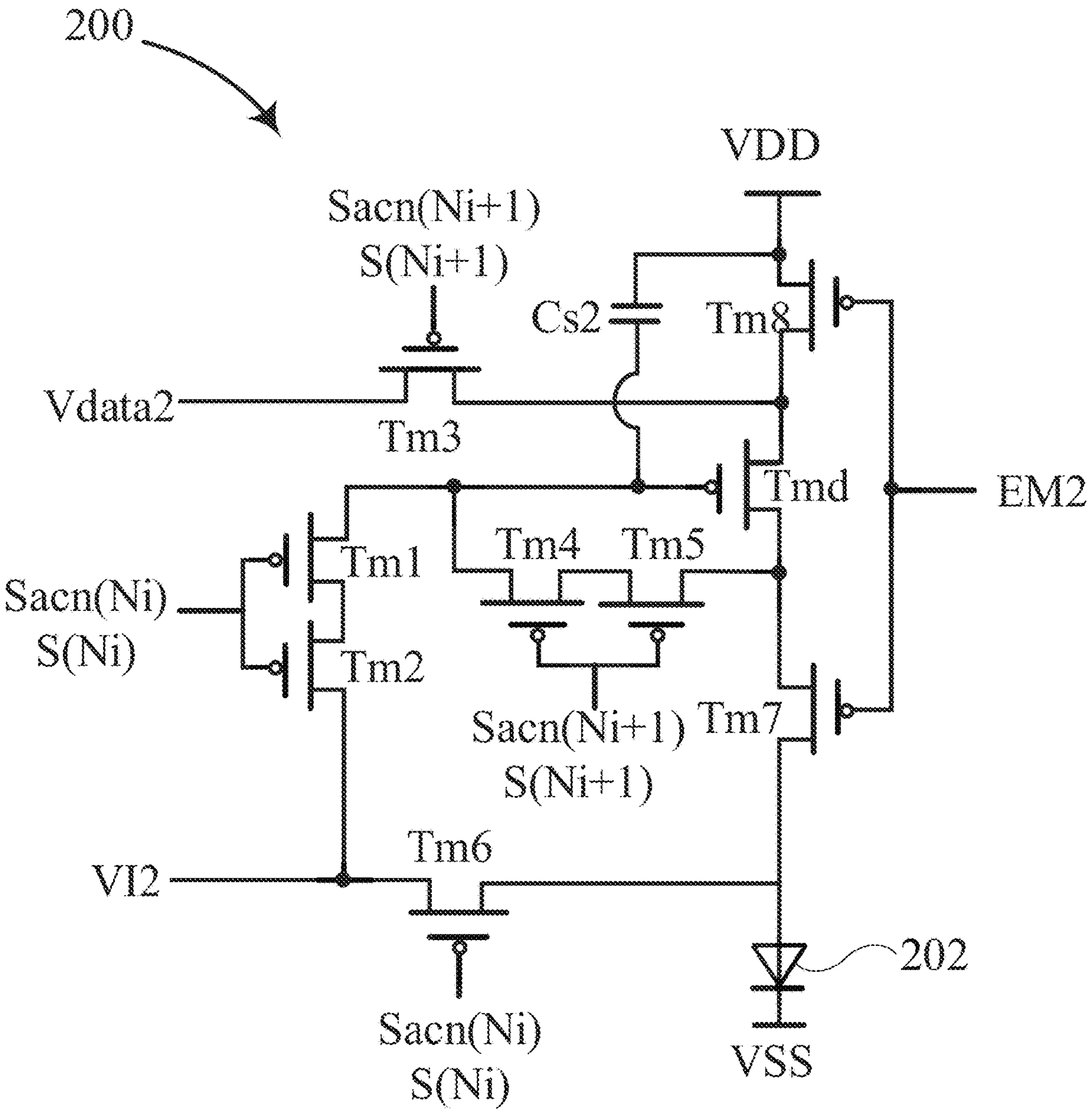
FIG. 6 is a schematic structural view of the main pixel driver circuit provided by the embodiment of the present application.

With further reference to FIG. 6, still taking a (M+1)th one of the pixel rows as a first one of the complex pixel rows as an example for explanation, the main pixel driver circuit connected to the main sub-pixels located in pth to qth ones of the complex pixel rows comprises: a second driver module, second initialization module, a second data writing module, a second reset module and a second compensation module.

The second driver module comprises a main driver transistor Tmd.

The second initialization module is connected between a second reset voltage end VI2 and a gate electrode of the main driver transistor Tmd and is configured to transmit a second reset signal to a gate electrode of the main driver transistor Tmd according to Nith level scan signal Scan(Ni) and initialize a gate electrode voltage of the main driver transistor Tmd.

The second data writing module is connected between a second data signal line Vdata2 and one of a source electrode and a drain electrode of the main driver transistor Tmd and is configured to transmit a second data signal Vdata2 to one of the source electrode and the drain electrode of the main driver transistor Tmd according to (Ni+1)th level scan signal Scan(Ni+1).

The second reset module is connected between the second reset voltage end VI2 and an anode of a corresponding one of the main sub-pixels and is configured to transmit the second reset signal VI2 to the anode of the main sub-pixel 202 according to Nith level scan signal Scan(Ni) and reset a anode voltage of the main sub-pixel 202.

The second compensation module is connected between the gate electrode of the main driver transistor Tmd and one of the source electrode or the drain electrode of the main driver transistor Tmd and is configured to transmit the second data signal Vdata2 to the gate electrode of the main driver transistor Tmd according to the (Ni+1)th level scan signal Scan(Ni+1) and compensate a threshold voltage of the main driver transistor Tmd.

The second storage module is connected in series between the gate electrode of the main driver transistor Tmd and the first voltage end VDD and is configured to maintain the gate electrode voltage of the main driver transistor Tmd.

The second light emission control module is connected in series to the main driver transistor Tmd and is configured to control the main sub-pixels 202 to emit light according to the second light emission control signal EM2.

$$Ni=M+p,\ Nq=M+q;\ 0<Y<Nq-Np,\ p\geq 1,\ q>p.$$

Specifically, the second initialization module comprises a third initialization transistor Tm1 and a fourth initialization transistor Tm2. A gate electrode of the third initialization transistor Tm1 is connected to the scan signal lines of the Nith level Scan(Ni). A gate electrode of the fourth initialization transistor Tm2 is connected to the scan signal lines of the Nith level Scan(Ni). One of a source electrode and a drain electrode of the third initialization transistor Tm1 is connected to the gate electrode of the main driver transistor Tmd. One of the source electrode and the drain electrode of the second initialization transistor Ts2 is connected to the first reset voltage end VI1. The other of the source electrode and the drain electrode of the third initialization transistor Tm1 is connected to of the other of the source electrode and the drain electrode of the fourth initialization transistor Tm2.

The second data writing module comprises a second data transistor Tm3. A gate electrode of the second data transistor Tm3 is connected to the scan signal lines of the (Ni+1)th level Scan(Ni+1). One of a source electrode and a drain electrode of the second data transistor Tm3 is connected to a second data line Vdata2. The other of the source electrode and the drain electrode of the second data transistor Tm3 is connected to one of the source electrode and the drain electrode of the main driver transistor Tmd.

The second compensation module comprises a third compensation transistor Tm4 and a fourth compensation transistor Tm5. A gate electrode of the third compensation transistor Tm4 is connected to the scan signal lines of a (Ni+1)th level Scan(Ni+1). A gate electrode of the fourth compensation transistor Tm5 is connected to the scan signal lines of the (Ni+1)th level Scan(Ni+1). One of a source electrode and a drain electrode of the third compensation transistor Tm4 is electrically connected to the gate electrode of the main driver transistor Tmd. One of a source electrode and a drain electrode of the fourth compensation transistor Tm5 is connected to the other of the source electrode and the drain electrode of the main driver transistor Tmd. The other of the source electrode or the drain electrode of the third compensation transistor Tm4 is connected to the other of the source electrode and the drain electrode of the fourth compensation transistor Tm5.

The second reset module comprises a second reset transistor Tm6. A gate electrode of the second reset transistor Tm6 is connected to the scan signal lines of a Nith level Scan(Ni). One of a source electrode and a drain electrode of the second reset transistor Tm6 is connected to the second reset voltage end VI2. The other of the source electrode and the drain electrode of the second reset transistor Tm6 is connected to the anode of a corresponding one of the main sub-pixels 202.

The second light emission control module comprises a third switch transistor Tm7 and a fourth switch transistor Tm8. A gate electrode of the third switch transistor Tm7 is connected to a second light emitting signal control line EM2. One of a source electrode and a drain electrode of the third switch transistor Tm7 is connected to the other of the source electrode and the drain electrode of the main driver transistor Tmd and the other of the source electrode and the drain electrode of the fourth switch transistor Tm8. The other of the source electrode and the drain electrode of the third switch transistor Tm7 is connected to the anode of a corresponding one of the main sub-pixels 202. A gate electrode of the second switch transistor Ts8 is connected to the second light emitting signal control line EM2. One of the source electrode and the drain electrode of the fourth switch transistor Tm8 is connected to the first voltage end VDD. The other of the source electrode and the drain electrode of the fourth switch transistor Tm8 is connected to one of the source electrode and the drain electrode of the main driver transistor Tmd and one of the source electrode and the drain electrode of the second data transistor Tm3.

The second storage module comprises a second storage capacitor Cs2, and the second storage capacitor Cs2 is connected in series between the first voltage end VDD and the gate electrode of the main driver transistor Tmd.

A cathode of the main sub-pixels 202 is connected to the second voltage end VSS.

Figure 7:
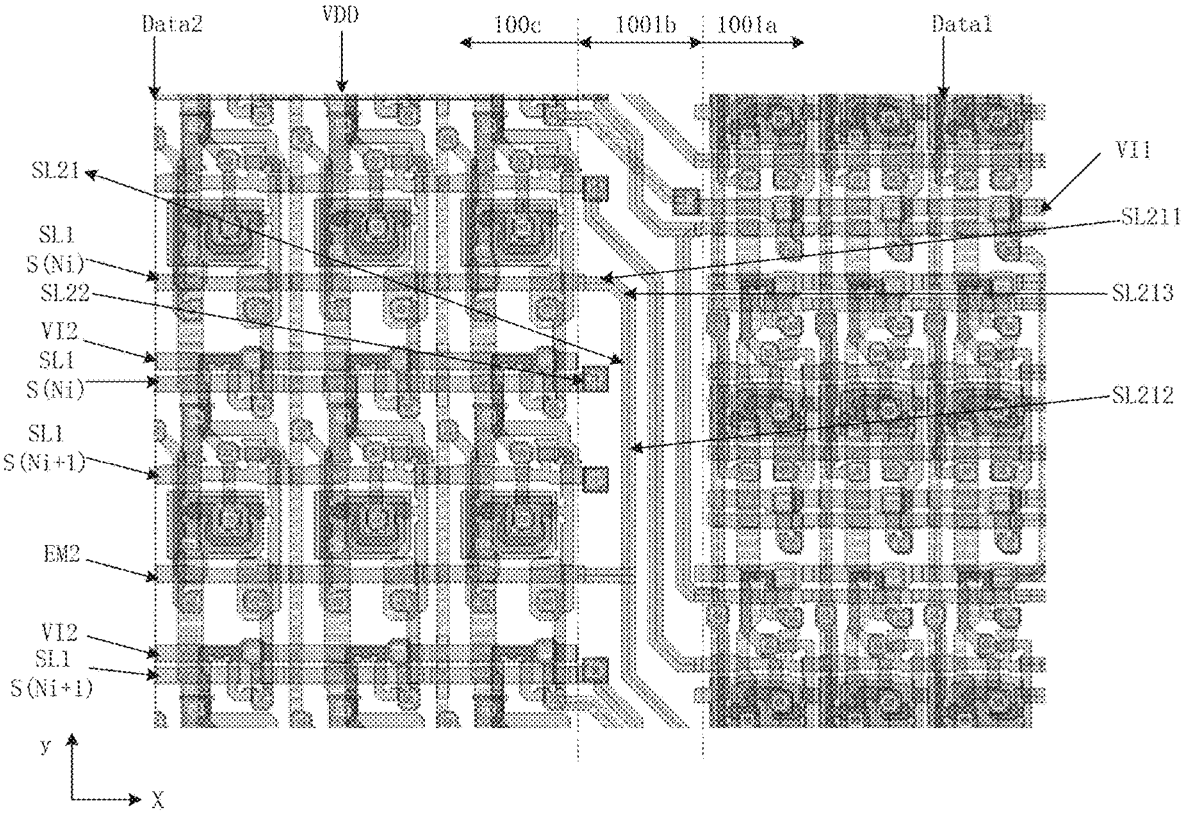
FIG. 7 is a schematic partial view of the gate electrode driver circuits connected to the auxiliary pixel driver circuits provided by the embodiment of the present application.

With further reference to FIG. 7, the scan signal lines comprises main scan signal lines SL1 and auxiliary scan signal lines SL2. The auxiliary scan signal lines SL2 comprise first auxiliary scan signal lines SL21 and second auxiliary scan signal lines SL22. Each of the main pixel driver circuits 200 is connected to a corresponding one of the gate electrode driver circuits 300 through a corresponding one of the main scan signal lines SL1. Each of the auxiliary pixel driver circuits 100 is connected to a corresponding one of the main scan signal lines SL1 through a corresponding one of the first auxiliary scan signal lines SL21 to be connected to a corresponding one of the gate electrode driver circuits 300. An end of each of the second auxiliary scan signal lines SL21 is connected to a corresponding one of the main scan signal lines SL1, and another end of the second auxiliary scan signal line SL21 floats. The first auxiliary scan signal lines SL21 is electrically connected to a corresponding one of the main scan signal lines SL1 in the transition display region 1001*b*.

Furthermore, each of the first auxiliary scan signal lines SL21 comprises a transition scan section located in the transition display region 1001*b*, the transition scan section comprises a first transition portion SL211, a second transition portion SL212, a third transition portion SL213. The first transition portion SL211 is connected to a corresponding one of the main scan signal lines SL1. The second transition portion SL212 is connected to a corresponding one of the auxiliary pixel driver circuits 100. The third transition portion SL213 is connected to the first transition portion SL211 and the second transition portion SL212. The second transition portion SL212 is tilted relative to the first transition portion SL211, the third transition portion SL213 for connection with the main pixel driver circuits 200 and the auxiliary pixel driver circuits 100 located in different horizontal lines to achieve scan signal transmission.

The first data signal line Data1, the second data signal line Data2 and a power signal line connected to the first voltage end VDD extend along a second direction y. The main scan signal lines SL1, the auxiliary scan signal lines SL2, the first light emitting signal control line EM1, and the second light emitting signal control line EM2 extend along a first direction x intersecting the second direction y.

The embodiment of the present invention further provides a display device comprising the above display panel. The display device further comprises a sensor, the sensor right faces the light transmission display region of the display panel. The sensor comprises fingerprint recognition sensor, camera, structural optical sensor, flight duration sensor, distance sensor, optical sensor, etc. such that the sensors can acquire signals through the light transmission display region to make the display device achieve under panel sensing solutions such as under panel fingerprint recognition, camera under panel, under panel facial recognition, and under panel distance sensing.

Advantages are as follows: In the display panel and the display device provided by the present invention, each of the auxiliary pixel driver circuits is connected to a plurality of auxiliary sub-pixels to drive corresponding ones of the auxiliary sub-pixels to emit light. Each of the main pixel driver circuits is connected to a corresponding one of the main sub-pixels to drive the corresponding main sub-pixel to emit light. The gate electrode driver circuits in levels are connected to the auxiliary pixel driver circuits and the main pixel driver circuits respectively through a plurality of scan signal lines. The scan signal lines of each level comprise main scan signal lines of a number P and auxiliary scan signal lines of a number Q. The auxiliary scan signal lines of the number Q comprise first auxiliary scan signal lines of a number Z and second auxiliary scan signal lines of a number (Q−Z). Each of the main pixel driver circuits is connected to a corresponding gate electrode driver circuit of through a corresponding one of the main scan signal lines. The present invention connects each of the auxiliary pixel driver circuits to the gate electrode driver circuit through first auxiliary scan signal lines of a number Z in the auxiliary scan signal lines of a number Q and makes remaining second auxiliary scan signal lines float without disposing a connection wire merging two scan signal lines into one wire to prevent a coupling effect easily occurring between the connection wire and the pixel driver circuit to prevent influence to normal display.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A display panel, comprising a function add-on region and a main display region surrounding the function add-on region, wherein the function add-on region comprises a light transmission display region and a transition display region located on an outer periphery of the light transmission display region, and the display panel comprises:

- a plurality of pixel rows, wherein the pixel rows comprise a plurality of complex pixel rows, each of the complex pixel rows comprises a plurality of auxiliary sub-pixels located in the function add-on region and a plurality of main sub-pixels located in the main display region;
- a plurality of auxiliary pixel driver circuits, wherein each of the auxiliary pixel driver circuits is connected to the auxiliary sub-pixels and is configured to drive corresponding ones of the auxiliary sub-pixels to emit light, and the auxiliary pixel driver circuits are located in the transition display region;
- a plurality of main pixel driver circuits, wherein each of the main pixel driver circuits is connected to a corresponding one of the main sub-pixels to drive the corresponding one of the main sub-pixels to emit light, and the main pixel driver circuits are located in the main display region; and
- gate electrode driver circuits in levels connected to the auxiliary pixel driver circuits and the main pixel driver circuits respectively through a plurality of scan signal lines, wherein the scan signal lines of each level comprises main scan signal lines of a number P and auxiliary scan signal lines of a number Q, the auxiliary scan signal lines of the number Q comprise first auxiliary scan signal lines of a number Z and second auxiliary scan signal lines of a number (Q−Z), each of the main pixel driver circuits is connected to a corresponding one of the gate electrode driver circuits through a corresponding one of the main scan signal lines, each of the auxiliary pixel driver circuits is connected to a corresponding one of the main scan signal lines through the first auxiliary scan signal line to be connected to a corresponding one of the gate electrode driver circuits, an end of each of the second auxiliary scan signal lines is connected to a corresponding one of the main scan signal lines, and another end floats; wherein $P \geq Q$, $P \geq 2$, $Q \geq 1$, $Q \geq Z$, $Z=1$, and P and Q are integers.

2. The display panel according to claim 1, wherein $P=2$, $Q=2$ or 1.

3. The display panel according to claim 1, wherein an end of each of the second auxiliary scan signal lines is connected to a corresponding one of the main scan signal lines in the main display region, and another end of each of the second auxiliary scan signal lines floats in the transition display region.

4. The display panel according to claim 3, wherein the first auxiliary scan signal line comprises a transition scan section located in the transition display region, and the transition scan section comprises:

- a first transition portion connected to a corresponding one of the main scan signal lines;
- a second transition portion connected to a corresponding one of the auxiliary pixel driver circuits; and
- a third transition portion connected to the first transition portion and the second transition portion;
- wherein the second transition portion is tilted relative to the first transition portion and the third transition portion.

5. The display panel according to claim 1, wherein a (M+1)th one of the pixel rows is a first one of the complex pixel rows, in the first auxiliary scan signal lines connected to the auxiliary pixel driver circuits connected to the auxiliary sub-pixels located in an ith one of the complex pixel rows, the first auxiliary scan signal lines corresponding to the scan signal lines of a Nith level are connected to the main pixel driver circuits connected to the main sub-pixels located in the ith one of the complex pixel rows; wherein $Ni=M+i$, $i \geq 1$.

6. The display panel according to claim 5, wherein the auxiliary pixel driver circuits connected to the auxiliary sub-pixels located in pth to qth ones of the complex pixel rows are connected to the scan signal lines of a Npth level, the scan signal lines of a (Np+Y)th level, and the scan signal lines of a Nqth level, the main pixel driver circuits corresponding to the main sub-pixels located in the ith one of the complex pixel rows are connected to the scan signal lines of the Nith level and the scan signal lines of a (Ni+1)th level; wherein $Np=M+p$, $Nq=M+q$, $Ni=M+i$; $0<Y<Nq-Np$; $p \leq i \leq q$.

7. The display panel according to claim 1, wherein each of the main pixel driver circuits is connected to the gate electrode driver circuits of a number X1, and each of the auxiliary pixel driver circuits is connected to the gate electrode driver circuits of a number X2; wherein $X1 \geq 2$, $X2 \geq 2$, $X2 \geq X1$.

8. The display panel according to claim 1, wherein a Mth one of the pixel rows is a first one of the complex pixel rows, and each of the auxiliary pixel driver circuits connected to the auxiliary sub-pixels located in pth to qth ones of the complex pixel rows comprises:

a first driver module comprising an auxiliary driver transistor;

a first initialization module connected between a first reset voltage end and a gate electrode of the auxiliary driver transistor and configured to transmit a first reset signal to the gate electrode of the auxiliary driver transistor according to a Npth level scan signal and initialize a gate electrode voltage of the auxiliary driver transistor;

a first data writing module connected to a first data signal line and one of a source electrode and a drain electrode of the auxiliary driver transistor and configured to transmit a first data signal to one of the source electrode or the drain electrode of the auxiliary driver transistor according to a (Np+Y)th level scan signal;

a first reset module connected between the first reset voltage end and anodes of corresponding ones of the auxiliary sub-pixels and configured to transmit the first reset signal to the anodes of the auxiliary sub-pixels according to a Nqth level scan signal and reset anode voltages of the auxiliary sub-pixels;

a first compensation module connected between the gate electrode of the auxiliary driver transistor and one of the source electrode or the drain electrode of the auxiliary driver transistor and configured to transmit the first data signal to the gate electrode of the auxiliary driver transistor according to the (Np+Y)th level scan signal and compensate a threshold voltage of the auxiliary driver transistor;

a first storage module connected in series between the gate electrode of the auxiliary driver transistor and a first voltage end and configured to maintain the gate electrode voltage of the auxiliary driver transistor; and a first light emission control module connected in series to the auxiliary driver transistor and configured to control the auxiliary sub-pixels to emit light according to a first light emission control signal;

wherein $N_p=M+p$, $N_q=M+q$; $0<Y<N_q-N_p$, $p\geq 1$, $q>p$.

9. A display panel, comprising a function add-on region and a main display region surrounding the function add-on region, and the display panel comprising:

a plurality of pixel rows, wherein the pixel rows comprise a plurality of complex pixel rows, each of the complex pixel rows comprises a plurality of auxiliary sub-pixels located in the function add-on region and a plurality of main sub-pixels located in the main display region;

a plurality of auxiliary pixel driver circuits, wherein each of the auxiliary pixel driver circuits is connected to the auxiliary sub-pixels and is configured to drive corresponding ones of the auxiliary sub-pixels to emit light;

a plurality of main pixel driver circuits, wherein each of the main pixel driver circuits is connected to a corresponding one of the main sub-pixels to drive the corresponding one of the main sub-pixels to emit light; and gate electrode driver circuits in levels connected to the auxiliary pixel driver circuits and the main pixel driver circuits respectively through a plurality of scan signal lines, wherein the scan signal lines of each level comprises main scan signal lines of a number P and auxiliary scan signal lines of a number Q, the auxiliary scan signal lines of the number Q comprise first auxiliary scan signal lines of a number Z and second auxiliary scan signal lines of a number (Q−Z), each of the main pixel driver circuits is connected to a corresponding one of the gate electrode driver circuits through a corresponding one of the main scan signal lines, each of the auxiliary pixel driver circuits is connected to a corresponding one of the main scan signal lines through the first auxiliary scan signal line to be connected to a corresponding one of the gate electrode driver circuits, an end of each of the second auxiliary scan signal lines is connected to a corresponding one of the main scan signal lines, and another end floats; wherein $P\geq Q$, $P\geq 2$, $Q\geq 1$, $Q\geq Z$, $Z=1$, and P and Q are integers.

10. The display panel according to claim 9, wherein $Z=1$.

11. The display panel according to claim 10, wherein $P=2$, and $Q=2$ or 1.

12. The display panel according to claim 9, wherein the function add-on region comprises a light transmission display region and a transition display region located on an outer periphery of the light transmission display region, the main pixel driver circuits are located in the main display region, and the auxiliary pixel driver circuits are located in the transition display region.

13. The display panel according to claim 12, wherein an end of each of the second auxiliary scan signal lines is connected to a corresponding one of the main scan signal lines in the main display region, and another end of each of the second auxiliary scan signal lines floats in the transition display region.

14. The display panel according to claim 13, wherein the first auxiliary scan signal line comprises a transition scan section located in the transition display region, and the transition scan section comprises:

a first transition portion connected to a corresponding one of the main scan signal lines;

a second transition portion connected to a corresponding one of the auxiliary pixel driver circuits; and a third transition portion connected to the first transition portion and the second transition portion;

wherein the second transition portion is tilted relative to the first transition portion and the third transition portion.

15. The display panel according to claim 9, wherein a (M+1)th one of the pixel rows is a first one of the complex pixel rows, in the first auxiliary scan signal lines connected to the auxiliary pixel driver circuits connected to the auxiliary sub-pixels located in an ith one of the complex pixel rows, the first auxiliary scan signal lines corresponding to the scan signal lines of a Nith level are connected to the main pixel driver circuits connected to the main sub-pixels located in the ith one of the complex pixel rows; wherein $N_i=M+i$, $i\geq 1$.

16. The display panel according to claim 15, wherein the auxiliary pixel driver circuits connected to the auxiliary sub-pixels located in pth to qth ones of the complex pixel rows are connected to the scan signal lines of a Npth level, the scan signal lines of a (Np+Y)th level, and the scan signal lines of a Nqth level, the main pixel driver circuits corresponding to the main sub-pixels located in the ith one of the complex pixel rows are connected to the scan signal lines of the Nith level and the scan signal lines of a (Ni+1)th level; wherein $N_p=M+p$, $N_q=M+q$, $N_i=M+i$; $0<Y<N_q-N_p$; $p\leq i\leq q$.

17. The display panel according to claim 9, wherein each of the main pixel driver circuits is connected to the gate electrode driver circuits of a number X1, and each of the auxiliary pixel driver circuits is connected to the gate electrode driver circuits of a number X2; wherein $X1\geq 2$, $X2\geq 2$, $X2\geq X1$.

18. The display panel according to claim 9, wherein a Mth one of the pixel rows is a first one of the complex pixel rows, and each of the auxiliary pixel driver circuits connected to the auxiliary sub-pixels located in pth to qth ones of the complex pixel rows comprises:

a first driver module comprising an auxiliary driver transistor;

a first initialization module connected between a first reset voltage end and a gate electrode of the auxiliary driver transistor and configured to transmit a first reset signal to the gate electrode of the auxiliary driver transistor according to a Npth level scan signal and initialize a gate electrode voltage of the auxiliary driver transistor;

a first data writing module connected to a first data signal line and one of a source electrode and a drain electrode of the auxiliary driver transistor and configured to transmit a first data signal to one of the source electrode or the drain electrode of the auxiliary driver transistor according to a (Np+Y)th level scan signal;

a first reset module connected between the first reset voltage end and anodes of corresponding ones of the auxiliary sub-pixels and configured to transmit the first reset signal to the anodes of the auxiliary sub-pixels according to a Nqth level scan signal and reset anode voltages of the auxiliary sub-pixels;

a first compensation module connected between the gate electrode of the auxiliary driver transistor and one of the source electrode or the drain electrode of the auxiliary driver transistor and configured to transmit the first data signal to the gate electrode of the auxiliary driver transistor according to the (Np+Y)th level scan signal and compensate a threshold voltage of the auxiliary driver transistor;

a first storage module connected in series between the gate electrode of the auxiliary driver transistor and a first voltage end and configured to maintain the gate electrode voltage of the auxiliary driver transistor; and a first light emission control module connected in series to the auxiliary driver transistor and configured to control the auxiliary sub-pixels to emit light according to a first light emission control signal;

wherein $Np=M+p$, $Nq=M+q$; $0<Y<Nq-Np$, $p\geq 1$, $q>p$.

19. The display panel according to claim 9, wherein the Mth one of the pixel rows is a first one of the complex pixel rows, and each of the main pixel driver circuits connected to the main sub-pixels located in pth to qth ones of the complex pixel rows comprise:

a second driver module comprising a main driver transistor;

a second initialization module connected between a second reset voltage end and a gate electrode of the main driver transistor and configured to transmit a second reset signal to the gate electrode of the main driver transistor according to a Nith level scan signal and initialize a gate electrode voltage of the main driver transistor;

a second data writing module connected between a second data signal line and one of a source electrode and a drain electrode of the main driver transistor and configured to transmit the second data signal to one of the source electrode or the drain electrode of the main driver transistor according to a (Ni+1)th level scan signal;

a second reset module connected between the second reset voltage end and anodes of the main sub-pixels and configured to transmit the second reset signal to the anodes of the main sub-pixels according to the Nith level scan signal and reset a anode voltage of the main sub-pixels;

a second compensation module connected between the gate electrode of the main driver transistor and the source electrode or the drain electrode of the main driver transistor and configured to transmit the second data signal to the gate electrode of the main driver transistor and compensate a threshold voltage of the main driver transistor according to the (Ni+1)th level scan signal;

a second storage module connected in series between the gate electrode of the main driver transistor and a second voltage end and configured to maintain the gate electrode voltage of the main driver transistor; and a second light emission control module connected in series to the main driver transistor and configured to control the main sub-pixels to emit light according to a second light emission control signal;

wherein $Ni=M+p$, $Nq=M+q$; $0<Y<Nq-Np$, $p\geq 1$, $q>p$.

20. A display device, comprising a display panel, wherein the display panel comprises a function add-on region and a main display region surrounding the function add-on region, and the display panel comprises:

a plurality of pixel rows, wherein the pixel rows comprise a plurality of complex pixel rows, each of the complex pixel rows comprises a plurality of auxiliary sub-pixels located in the function add-on region and a plurality of main sub-pixels located in the main display region;

a plurality of auxiliary pixel driver circuits, wherein each of the auxiliary pixel driver circuits is connected to the auxiliary sub-pixels and is configured to drive corresponding ones of the auxiliary sub-pixels to emit light;

a plurality of main pixel driver circuits, wherein each of the main pixel driver circuits is connected to a corresponding one of the main sub-pixels to drive the corresponding one of the main sub-pixels to emit light; and gate electrode driver circuits in levels connected to the auxiliary pixel driver circuits and the main pixel driver circuits respectively through a plurality of scan signal lines, wherein the scan signal lines of each level comprises main scan signal lines of a number P and auxiliary scan signal lines of a number Q, the auxiliary scan signal lines of the number Q comprise first auxiliary scan signal lines of a number Z and second auxiliary scan signal lines of a number (Q−Z), each of the main pixel driver circuits is connected to a corresponding one of the gate electrode driver circuits through a corresponding one of the main scan signal lines, each of the auxiliary pixel driver circuits is connected to a corresponding one of the main scan signal lines through the first auxiliary scan signal line to be connected to a corresponding one of the gate electrode driver circuits, an end of each of the second auxiliary scan signal lines is connected to a corresponding one of the main scan signal lines, and another end floats; wherein $P\geq Q$, $P\geq 2$, $Q\geq 1$, $Q\geq Z$, $Z=1$, and P and Q are integers.

* * * * *